US011385608B2

(12) United States Patent
Nixon et al.

(10) Patent No.: US 11,385,608 B2
(45) Date of Patent: Jul. 12, 2022

(54) BIG DATA IN PROCESS CONTROL SYSTEMS

(71) Applicant: FISHER-ROSEMOUNT SYSTEMS, INC., Round Rock, TX (US)

(72) Inventors: Mark J. Nixon, Round Rock, TX (US); Terrence Blevins, Round Rock, TX (US); Daniel D. Christensen, Austin, TX (US); Paul R. Muston, Narborough (GB); Ken Beoughter, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 441 days.

(21) Appl. No.: 15/398,882

(22) Filed: Jan. 5, 2017

(65) Prior Publication Data

US 2017/0115648 A1 Apr. 27, 2017

Related U.S. Application Data

(63) Continuation of application No. 13/784,041, filed on Mar. 4, 2013, now Pat. No. 9,558,220.

(51) Int. Cl.
  *G05B 19/42* (2006.01)
  *G05B 19/042* (2006.01)
  (Continued)

(52) U.S. Cl.
  CPC .......... *G05B 19/042* (2013.01); *G05B 15/02* (2013.01); *G05B 23/0208* (2013.01); *G06F 16/22* (2019.01); *G05B 2219/15052* (2013.01)

(58) Field of Classification Search
  CPC .. G05B 23/0208; G05B 19/042; G05B 15/02; G05B 2219/15052; G06F 17/30312; G06F 16/22

(Continued)

(56) References Cited

U.S. PATENT DOCUMENTS 4,451,047 A 5/1984 Herd et al.
4,593,367 A 6/1986 Slack et al.
(Continued)

FOREIGN PATENT DOCUMENTS

AU 2010257310 A1 7/2012
CN 1170464 A 1/1998
(Continued)

OTHER PUBLICATIONS

Final Rejection for Japanese Application No. 2014-048410, dated May 29, 2018.
(Continued)

*Primary Examiner* — Jensen Hu
(74) *Attorney, Agent, or Firm* — Marshall, Gerstein & Borun LLP

(57) ABSTRACT

A big data network or system for a process control system or plant includes a big data apparatus including a data storage area configured to store, using a common data schema, multiple types of process data and/or plant data (such as configuration and real-time data) that is used in, generated by or received by the process control system, and one or more data receiver computing devices to receive the data from multiple nodes or devices. The data may be cached and time-stamped at the nodes and streamed to the big data apparatus for storage. The process control system big data system provides services and/or data analyses to automatically or manually discover prescriptive and/or predictive knowledge, and to determine, based on the discovered knowledge, changes and/or additions to the process control system and to the set of services and/or analyses to optimize the process control system or plant.

21 Claims, 7 Drawing Sheets

(51) Int. Cl.
*G05B 15/02* (2006.01)
*G06F 16/22* (2019.01)
*G05B 23/02* (2006.01)

(58) Field of Classification Search
USPC .......................................................... 707/812
See application file for complete search history.

(56) References Cited

U.S. PATENT DOCUMENTS

| | | | |
|---|---|---|---|
| 4,901,221 A | 2/1990 | Kodosky et al. | |
| 4,914,568 A | 4/1990 | Kodosky et al. | |
| 5,111,531 A | 5/1992 | Grayson et al. | |
| 5,164,897 A | 11/1992 | Clark et al. | |
| 5,291,587 A | 3/1994 | Kodosky et al. | |
| 5,301,301 A | 4/1994 | Kodosky et al. | |
| 5,301,336 A | 4/1994 | Kodosky et al. | |
| 5,305,426 A | 4/1994 | Ushioda et al. | |
| 5,475,851 A | 12/1995 | Kodosky et al. | |
| 5,481,740 A | 1/1996 | Kodosky | |
| 5,481,741 A | 1/1996 | McKaskle et al. | |
| 5,497,500 A | 3/1996 | Rogers et al. | |
| 5,544,320 A | 8/1996 | Konrad | |
| 5,568,491 A | 10/1996 | Beal et al. | |
| 5,598,572 A | 1/1997 | Tanikoshi et al. | |
| 5,610,828 A | 3/1997 | Kodosky et al. | |
| 5,652,909 A | 7/1997 | Kodosky | |
| D384,050 S | 9/1997 | Kodosky | |
| D384,051 S | 9/1997 | Kodosky | |
| D384,052 S | 9/1997 | Kodosky | |
| D387,750 S | 12/1997 | Kodosky | |
| 5,710,723 A | 1/1998 | Hoth et al. | |
| 5,732,277 A | 3/1998 | Kodosky et al. | |
| 5,734,863 A | 3/1998 | Kodosky et al. | |
| 5,737,622 A | 4/1998 | Rogers et al. | |
| 5,758,143 A | 5/1998 | Levitan | |
| 5,801,942 A | 9/1998 | Nixon et al. | |
| 5,801,946 A | 9/1998 | Nissen et al. | |
| 5,821,934 A | 10/1998 | Kodosky et al. | |
| 5,828,851 A | 10/1998 | Nixon et al. | |
| 5,838,563 A | 11/1998 | Dove et al. | |
| 5,856,931 A | 1/1999 | McCasland | |
| 5,862,052 A | 1/1999 | Nixon et al. | |
| 5,862,054 A | 1/1999 | Li | |
| 5,909,368 A | 6/1999 | Nixon et al. | |
| 5,917,489 A | 6/1999 | Thurlow et al. | |
| 5,940,294 A | 8/1999 | Dove | |
| 5,971,747 A | 10/1999 | Lemelson et al. | |
| 5,980,078 A | 11/1999 | Krivoshein et al. | |
| 5,987,246 A | 11/1999 | Thomsen et al. | |
| 5,988,847 A | 11/1999 | McLaughlin et al. | |
| 5,990,906 A | 11/1999 | Hudson et al. | |
| 5,995,916 A | 11/1999 | Nixon et al. | |
| 6,009,422 A | 12/1999 | Ciccarelli | |
| 6,032,208 A | 2/2000 | Nixon et al. | |
| 6,064,409 A | 5/2000 | Thomsen et al. | |
| 6,078,320 A | 6/2000 | Dove et al. | |
| 6,098,116 A | 8/2000 | Nixon et al. | |
| 6,167,464 A | 12/2000 | Kretschmann | |
| 6,173,438 B1 | 1/2001 | Kodosky et al. | |
| 6,178,504 B1 | 1/2001 | Fieres et al. | |
| 6,195,591 B1 | 2/2001 | Nixon et al. | |
| 6,219,628 B1 | 4/2001 | Kodosky et al. | |
| 6,266,726 B1 | 7/2001 | Nixon et al. | |
| 6,278,374 B1 | 8/2001 | Ganeshan | |
| 6,285,966 B1 | 9/2001 | Brown et al. | |
| 6,295,513 B1 | 9/2001 | Thackston | |
| 6,324,877 B2 | 12/2001 | Neeley | |
| 6,347,253 B1 | 2/2002 | Fujita et al. | |
| 6,421,570 B1 * | 7/2002 | McLaughlin | G05B 19/4185 700/2 |
| 6,442,515 B1 | 8/2002 | Varma et al. | |
| 6,442,566 B1 | 8/2002 | Atman et al. | |
| 6,449,618 B1 * | 9/2002 | Blott | G06F 16/24568 |
| 6,463,352 B1 | 10/2002 | Tadokoro et al. | |
| 6,529,780 B1 | 3/2003 | Soergel et al. | |
| 6,535,883 B1 * | 3/2003 | Lee | G06F 9/44 707/752 |
| 6,563,430 B1 | 5/2003 | Kemink et al. | |
| 6,584,601 B1 | 6/2003 | Kodosky et al. | |
| 6,608,638 B1 | 8/2003 | Kodosky et al. | |
| 6,609,036 B1 | 8/2003 | Bickford | |
| 6,658,114 B1 | 12/2003 | Farn et al. | |
| 6,701,285 B2 | 3/2004 | Salonen | |
| 6,715,078 B1 | 3/2004 | Chasko et al. | |
| 6,715,139 B1 | 3/2004 | Kodosky et al. | |
| 6,763,515 B1 | 7/2004 | Vazquez et al. | |
| 6,768,116 B1 | 7/2004 | Berman et al. | |
| 6,772,017 B1 | 8/2004 | Dove et al. | |
| 6,778,873 B1 | 8/2004 | Wang et al. | |
| 6,784,903 B2 | 8/2004 | Kodosky et al. | |
| 6,847,850 B2 * | 1/2005 | Grumelart | G05B 21/02 700/19 |
| 6,868,538 B1 | 3/2005 | Nixon et al. | |
| 6,917,839 B2 | 7/2005 | Bickford | |
| 6,934,667 B2 | 8/2005 | Kodosky et al. | |
| 6,934,668 B2 | 8/2005 | Kodosky et al. | |
| 6,954,724 B2 | 10/2005 | Kodosky et al. | |
| 6,961,686 B2 | 11/2005 | Kodosky et al. | |
| 6,965,886 B2 | 11/2005 | Govrin et al. | |
| 6,970,758 B1 | 11/2005 | Shi et al. | |
| 6,971,066 B2 | 11/2005 | Schultz et al. | |
| 6,983,228 B2 | 1/2006 | Kodosky et al. | |
| 6,993,466 B2 | 1/2006 | Kodosky et al. | |
| 7,000,190 B2 | 2/2006 | Kudukoli et al. | |
| 7,006,881 B1 | 2/2006 | Hoffberg et al. | |
| 7,010,470 B2 | 3/2006 | Kodosky et al. | |
| 7,062,718 B2 | 6/2006 | Kodosky et al. | |
| 7,072,722 B1 | 7/2006 | Colonna et al. | |
| 7,123,974 B1 | 10/2006 | Hamilton | |
| 7,134,086 B2 | 11/2006 | Kodosky | |
| 7,134,090 B2 | 11/2006 | Kodosky et al. | |
| 7,143,149 B2 | 11/2006 | Oberg et al. | |
| 7,143,289 B2 | 11/2006 | Denning et al. | |
| 7,177,786 B2 | 2/2007 | Kodosky et al. | |
| 7,185,287 B2 | 2/2007 | Ghercioiu et al. | |
| 7,200,838 B2 | 4/2007 | Kodosky et al. | |
| 7,210,117 B2 | 4/2007 | Kudukoli et al. | |
| 7,213,057 B2 | 5/2007 | Trethewey et al. | |
| 7,216,334 B2 | 5/2007 | Kodosky et al. | |
| 7,219,306 B2 | 5/2007 | Kodosky et al. | |
| 7,222,131 B1 | 5/2007 | Grewal et al. | |
| 7,283,914 B2 | 10/2007 | Poorman et al. | |
| 7,283,971 B1 | 10/2007 | Levine et al. | |
| 7,302,675 B2 | 11/2007 | Rogers et al. | |
| 7,314,169 B1 | 1/2008 | Jasper et al. | |
| 7,340,737 B2 | 3/2008 | Ghercioiu et al. | |
| 7,343,605 B2 | 3/2008 | Langkafel et al. | |
| 7,346,404 B2 | 3/2008 | Eryurek et al. | |
| 7,367,028 B2 | 4/2008 | Kodosky et al. | |
| 7,383,253 B1 * | 6/2008 | Tsimelzon | G06F 16/24568 707/610 |
| 7,478,337 B2 | 1/2009 | Kodosky et al. | |
| 7,506,304 B2 | 3/2009 | Morrow et al. | |
| 7,530,052 B2 | 5/2009 | Morrow et al. | |
| 7,530,113 B2 * | 5/2009 | Braun | G05B 19/042 726/28 |
| 7,536,548 B1 | 5/2009 | Batke et al. | |
| RE40,817 E | 6/2009 | Krivoshein et al. | |
| 7,541,920 B2 | 6/2009 | Tambascio et al. | |
| 7,548,873 B2 | 6/2009 | Veeningen et al. | |
| 7,558,711 B2 | 7/2009 | Kodosky et al. | |
| 7,565,306 B2 | 7/2009 | Apostolides | |
| 7,574,690 B2 | 8/2009 | Shah et al. | |
| 7,590,987 B2 | 9/2009 | Behrendt et al. | |
| 7,594,220 B2 | 9/2009 | Kodosky et al. | |
| 7,598,856 B1 | 10/2009 | Nick et al. | |
| 7,606,681 B2 | 10/2009 | Esmaili et al. | |
| 7,616,095 B2 | 11/2009 | Jones et al. | |
| 7,617,542 B2 | 11/2009 | Vataja | |
| 7,627,860 B2 | 12/2009 | Kodosky et al. | |
| 7,630,914 B2 | 12/2009 | Veeningen et al. | |
| 7,640,007 B2 | 12/2009 | Chen et al. | |
| 7,644,052 B1 | 1/2010 | Chang et al. | |
| 7,650,264 B2 | 1/2010 | Kodosky et al. | |

(56) References Cited

U.S. PATENT DOCUMENTS

| | | |
|---|---|---|
| 7,653,563 B2 | 1/2010 | Veeningen et al. |
| 7,668,608 B2 | 2/2010 | Nixon et al. |
| 7,676,281 B2 | 3/2010 | Hood et al. |
| 7,680,546 B2 | 3/2010 | Gilbert et al. |
| 7,684,877 B2 | 3/2010 | Weatherhead et al. |
| RE41,228 E | 4/2010 | Kodosky et al. |
| 7,694,273 B2 | 4/2010 | Kodosky et al. |
| 7,707,014 B2 | 4/2010 | Kodosky et al. |
| 7,715,929 B2 | 5/2010 | Skourup et al. |
| 7,716,489 B1 | 5/2010 | Brandt et al. |
| 7,720,727 B2 | 5/2010 | Keyes et al. |
| 7,818,715 B2 | 10/2010 | Kodosky et al. |
| 7,818,716 B2 | 10/2010 | Kodosky et al. |
| 7,827,122 B1 | 11/2010 | Campbell, Jr. et al. |
| 7,831,914 B2 | 11/2010 | Kodosky et al. |
| 7,844,908 B2 | 11/2010 | Kodosky et al. |
| 7,853,431 B2 | 12/2010 | Samardzija et al. |
| 7,865,349 B2 | 1/2011 | Kodosky et al. |
| 7,882,490 B2 | 2/2011 | Kodosky et al. |
| 7,882,491 B2 | 2/2011 | Kodosky et al. |
| 7,890,461 B2 | 2/2011 | Oeda et al. |
| 7,925,979 B2 | 4/2011 | Forney et al. |
| 7,930,639 B2 | 4/2011 | Baier et al. |
| 7,934,095 B2 | 4/2011 | Laberteaux et al. |
| 7,937,665 B1 | 5/2011 | Vazquez et al. |
| 7,962,440 B2 * | 6/2011 | Baier ............... G05B 19/41875 |
| | | 706/62 |
| 7,978,059 B2 | 7/2011 | Petite et al. |
| 7,979,843 B2 | 7/2011 | Kodosky et al. |
| 7,984,423 B2 | 7/2011 | Kodosky et al. |
| 7,987,448 B2 | 7/2011 | Kodosky et al. |
| 8,014,722 B2 | 9/2011 | Abel et al. |
| 8,028,241 B2 | 9/2011 | Kodosky et al. |
| 8,028,242 B2 | 9/2011 | Kodosky et al. |
| 8,055,787 B2 * | 11/2011 | Victor ..................... H04L 49/90 |
| | | 709/238 |
| 8,060,834 B2 | 11/2011 | Lucas et al. |
| 8,073,967 B2 | 12/2011 | Peterson et al. |
| 8,074,201 B2 | 12/2011 | Ghercioiu et al. |
| 8,099,712 B2 | 1/2012 | Kodosky et al. |
| 8,102,400 B1 | 1/2012 | Cook et al. |
| 8,126,964 B2 | 2/2012 | Pretlove et al. |
| 8,132,225 B2 | 3/2012 | Chand et al. |
| 8,146,053 B2 | 3/2012 | Morrow et al. |
| 8,166,296 B2 | 4/2012 | Buer et al. |
| 8,171,137 B1 | 5/2012 | Parks et al. |
| 8,185,217 B2 | 5/2012 | Thiele |
| 8,185,495 B2 | 5/2012 | Clark et al. |
| 8,185,832 B2 | 5/2012 | Kodosky et al. |
| 8,185,833 B2 | 5/2012 | Kodosky et al. |
| 8,185,871 B2 | 5/2012 | Nixon et al. |
| 8,190,888 B2 | 5/2012 | Batke et al. |
| 8,191,005 B2 | 5/2012 | Baier et al. |
| 8,214,455 B2 | 7/2012 | Baier et al. |
| 8,218,651 B1 | 7/2012 | Eshet et al. |
| 8,219,669 B2 | 7/2012 | Agrusa et al. |
| 8,224,496 B2 | 7/2012 | Must et al. |
| 8,239,848 B2 | 8/2012 | Ghercioiu et al. |
| 8,266,066 B1 | 9/2012 | Wezter et al. |
| 8,290,762 B2 | 10/2012 | Kodosky et al. |
| 8,307,330 B2 | 11/2012 | Kumar et al. |
| 8,316,313 B2 | 11/2012 | Campney et al. |
| 8,321,663 B2 | 11/2012 | Medvinsky et al. |
| 8,327,130 B2 | 12/2012 | Wilkinson, Jr. et al. |
| 8,350,666 B2 | 1/2013 | Kore |
| 8,359,567 B2 | 1/2013 | Kornerup et al. |
| 8,397,172 B2 | 3/2013 | Kodosky et al. |
| 8,397,205 B2 | 3/2013 | Kornerup et al. |
| 8,413,118 B2 | 4/2013 | Kodosky et al. |
| 8,417,360 B2 | 4/2013 | Sustaeta et al. |
| 8,417,595 B2 | 4/2013 | Keyes et al. |
| 8,418,071 B2 | 4/2013 | Kodosky et al. |
| 8,429,627 B2 | 4/2013 | Jedlicka et al. |
| 8,448,135 B2 | 5/2013 | Kodosky |
| 8,521,332 B2 | 8/2013 | Tiemann et al. |
| 8,532,795 B2 | 9/2013 | Adavi et al. |
| 8,570,922 B2 | 10/2013 | Pratt, Jr. et al. |
| 8,612,870 B2 | 12/2013 | Kodosky et al. |
| 8,624,725 B1 | 1/2014 | MacGregor |
| 8,640,112 B2 | 1/2014 | Yi et al. |
| 8,656,351 B2 | 2/2014 | Kodosky et al. |
| 8,688,780 B2 | 4/2014 | Gordon et al. |
| 8,781,776 B2 | 7/2014 | Onda et al. |
| 8,832,236 B2 | 9/2014 | Hernandez et al. |
| 8,838,636 B2 | 9/2014 | Kulkarni et al. |
| 8,886,598 B1 * | 11/2014 | Emigh ................. G06Q 10/109 |
| | | 707/620 |
| 8,943,469 B2 | 1/2015 | Kumar et al. |
| 8,977,851 B2 | 3/2015 | Neitzel et al. |
| 9,002,973 B2 | 4/2015 | Panther |
| 9,021,021 B2 | 4/2015 | Backholm et al. |
| 9,024,972 B1 | 5/2015 | Bronder et al. |
| 9,038,043 B1 | 5/2015 | Fleetwood et al. |
| 9,047,007 B2 | 6/2015 | Kodosky et al. |
| 9,088,665 B2 | 7/2015 | Boyer et al. |
| 9,098,164 B2 | 8/2015 | Kodosky |
| 9,110,558 B2 | 8/2015 | Kodosky |
| 9,119,166 B1 | 8/2015 | Sheikh |
| 9,122,764 B2 | 9/2015 | Neitzel et al. |
| 9,122,786 B2 | 9/2015 | Cammert et al. |
| 9,134,895 B2 | 9/2015 | Dove et al. |
| 9,229,871 B2 | 1/2016 | Washiro |
| 9,235,395 B2 | 1/2016 | Kodosky et al. |
| 9,244,452 B2 | 1/2016 | Brandes et al. |
| 9,285,795 B2 | 3/2016 | Nixon et al. |
| 9,338,218 B1 | 5/2016 | Florissi et al. |
| 9,361,320 B1 | 6/2016 | Vijendra et al. |
| 9,397,836 B2 | 7/2016 | Nixon et al. |
| 9,424,398 B1 | 8/2016 | McLeod et al. |
| 9,430,114 B1 | 8/2016 | Dingman et al. |
| 9,459,809 B1 | 10/2016 | Chen et al. |
| 9,466,038 B2 | 10/2016 | Kezeu |
| 9,516,354 B1 | 12/2016 | Verheem et al. |
| 9,532,232 B2 | 12/2016 | Dewey et al. |
| 9,541,905 B2 | 1/2017 | Nixon et al. |
| 9,558,220 B2 | 1/2017 | Nixon et al. |
| 9,652,213 B2 | 5/2017 | MacCleery et al. |
| 9,678,484 B2 | 6/2017 | Nixon et al. |
| 9,697,170 B2 | 7/2017 | Nixon et al. |
| 9,804,588 B2 | 10/2017 | Blevins et al. |
| 9,892,353 B1 | 2/2018 | Lui et al. |
| 9,934,477 B1 | 4/2018 | Hansen et al. |
| 2002/0010694 A1 | 1/2002 | Navab et al. |
| 2002/0035495 A1 | 3/2002 | Spira et al. |
| 2002/0052715 A1 | 5/2002 | Maki |
| 2002/0054130 A1 | 5/2002 | Abbott et al. |
| 2002/0064138 A1 | 5/2002 | Saito et al. |
| 2002/0077711 A1 * | 6/2002 | Nixon ................... C10G 11/187 |
| | | 700/51 |
| 2002/0080174 A1 | 6/2002 | Kodosky et al. |
| 2002/0087419 A1 | 7/2002 | Andersson et al. |
| 2002/0094085 A1 | 7/2002 | Roberts |
| 2002/0120475 A1 | 8/2002 | Morimoto |
| 2002/0123864 A1 * | 9/2002 | Eryurek ............. G05B 23/0254 |
| | | 702/188 |
| 2002/0128998 A1 | 9/2002 | Kil et al. |
| 2002/0130846 A1 | 9/2002 | Nixon et al. |
| 2002/0138168 A1 | 9/2002 | Salonen |
| 2002/0138320 A1 | 9/2002 | Robertson et al. |
| 2002/0149497 A1 | 10/2002 | Jaggi |
| 2002/0159441 A1 | 10/2002 | Travaly et al. |
| 2002/0169514 A1 | 11/2002 | Eryurek et al. |
| 2002/0188366 A1 | 12/2002 | Pepper et al. |
| 2002/0194112 A1 | 12/2002 | dePinto et al. |
| 2002/0194209 A1 | 12/2002 | Bolosky et al. |
| 2003/0020726 A1 | 1/2003 | Charpentier |
| 2003/0023795 A1 | 1/2003 | Packwood et al. |
| 2003/0028495 A1 | 2/2003 | Pallante |
| 2003/0037119 A1 | 2/2003 | Austin |
| 2003/0061295 A1 | 3/2003 | Oberg et al. |
| 2003/0083756 A1 | 5/2003 | Hsiung et al. |
| 2003/0084053 A1 | 5/2003 | Govrin et al. |
| 2003/0093309 A1 | 5/2003 | Tanikoshi et al. |
| 2003/0139837 A1 | 7/2003 | Marr |

(56) References Cited

U.S. PATENT DOCUMENTS

| | | |
|---|---|---|
| 2003/0147351 A1 | 8/2003 | Greenlee |
| 2003/0154044 A1 | 8/2003 | Lundstedt et al. |
| 2003/0172065 A1 | 9/2003 | Sorenson et al. |
| 2003/0195934 A1* | 10/2003 | Peterson .............. H04L 67/306 709/206 |
| 2004/0005859 A1 | 1/2004 | Ghercioiu et al. |
| 2004/0012632 A1 | 1/2004 | King et al. |
| 2004/0014479 A1 | 1/2004 | Milman |
| 2004/0075689 A1 | 4/2004 | Schleiss et al. |
| 2004/0093102 A1 | 5/2004 | Liiri et al. |
| 2004/0098148 A1* | 5/2004 | Retlich ............ G05B 19/41885 700/83 |
| 2004/0117233 A1 | 6/2004 | Rapp |
| 2004/0133457 A1 | 7/2004 | Sadiq et al. |
| 2004/0153437 A1 | 8/2004 | Buchan |
| 2004/0153804 A1 | 8/2004 | Blevins et al. |
| 2004/0186927 A1 | 9/2004 | Eryurek et al. |
| 2004/0203874 A1 | 10/2004 | Brandt et al. |
| 2004/0204775 A1 | 10/2004 | Keyes et al. |
| 2004/0210330 A1 | 10/2004 | Birkle |
| 2004/0230328 A1 | 11/2004 | Armstrong et al. |
| 2004/0233930 A1 | 11/2004 | Colby |
| 2004/0259533 A1 | 12/2004 | Nixon et al. |
| 2005/0005259 A1 | 1/2005 | Avery et al. |
| 2005/0007249 A1 | 1/2005 | Eryurek et al. |
| 2005/0033481 A1 | 2/2005 | Budhraja et al. |
| 2005/0049835 A1 | 3/2005 | Mayer et al. |
| 2005/0060111 A1 | 3/2005 | Ramillon et al. |
| 2005/0062677 A1 | 3/2005 | Nixon et al. |
| 2005/0080799 A1 | 4/2005 | Harnden et al. |
| 2005/0096872 A1 | 5/2005 | Blevins et al. |
| 2005/0130634 A1 | 6/2005 | Godfrey |
| 2005/0164684 A1 | 7/2005 | Chen et al. |
| 2005/0182650 A1 | 8/2005 | Maddox et al. |
| 2005/0187649 A1 | 8/2005 | Funk et al. |
| 2005/0197806 A1 | 9/2005 | Eryurek et al. |
| 2005/0213768 A1 | 9/2005 | Durham et al. |
| 2005/0222691 A1 | 10/2005 | Glas et al. |
| 2005/0222698 A1 | 10/2005 | Eryurek et al. |
| 2005/0264527 A1 | 12/2005 | Lin |
| 2005/0289183 A1 | 12/2005 | Kaneko et al. |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0161394 A1 | 7/2006 | Dulberg et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0235741 A1 | 10/2006 | Deaton et al. |
| 2006/0241792 A1 | 10/2006 | Pretlove et al. |
| 2006/0288091 A1 | 12/2006 | Oh et al. |
| 2006/0288330 A1 | 12/2006 | Bahrami et al. |
| 2006/0291481 A1 | 12/2006 | Kumar |
| 2006/0294087 A1 | 12/2006 | Mordvinov |
| 2007/0005266 A1 | 1/2007 | Blevins et al. |
| 2007/0014406 A1 | 1/2007 | Scheldt et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0085840 A1 | 4/2007 | Asaka et al. |
| 2007/0112574 A1* | 5/2007 | Greene ................ G06F 9/5072 709/201 |
| 2007/0118516 A1 | 5/2007 | Li et al. |
| 2007/0130206 A1 | 6/2007 | Zhou et al. |
| 2007/0130310 A1 | 6/2007 | Batke et al. |
| 2007/0130572 A1 | 6/2007 | Gilbert et al. |
| 2007/0132779 A1* | 6/2007 | Gilbert ................ G06F 9/4488 345/619 |
| 2007/0139441 A1 | 6/2007 | Lucas et al. |
| 2007/0142936 A1 | 6/2007 | Denison et al. |
| 2007/0168060 A1 | 7/2007 | Nixon et al. |
| 2007/0179645 A1 | 8/2007 | Nixon et al. |
| 2007/0185754 A1 | 8/2007 | Schmidt |
| 2007/0211079 A1 | 9/2007 | Nixon et al. |
| 2007/0239292 A1 | 10/2007 | Ehrman et al. |
| 2007/0250292 A1 | 10/2007 | Alagappan et al. |
| 2007/0265801 A1 | 11/2007 | Foslien et al. |
| 2007/0265866 A1 | 11/2007 | Fehling et al. |
| 2008/0010455 A1 | 1/2008 | Holtzman et al. |
| 2008/0021874 A1 | 1/2008 | Dahl et al. |
| 2008/0040719 A1 | 2/2008 | Shimizu et al. |
| 2008/0046104 A1 | 2/2008 | Van Camp et al. |
| 2008/0058968 A1 | 3/2008 | Sharma et al. |
| 2008/0065243 A1 | 3/2008 | Fallman et al. |
| 2008/0065705 A1 | 3/2008 | Miller |
| 2008/0065706 A1 | 3/2008 | Miller et al. |
| 2008/0076431 A1 | 3/2008 | Fletcher et al. |
| 2008/0078189 A1 | 4/2008 | Ando |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0085682 A1 | 4/2008 | Rao |
| 2008/0086428 A1 | 4/2008 | Wallace |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0109090 A1 | 5/2008 | Esmaili et al. |
| 2008/0114710 A1 | 5/2008 | Pucher |
| 2008/0125912 A1 | 5/2008 | Heilman et al. |
| 2008/0126352 A1 | 5/2008 | Case |
| 2008/0126408 A1* | 5/2008 | Middleton .......... G06F 16/2477 |
| 2008/0126665 A1 | 5/2008 | Burr et al. |
| 2008/0134215 A1 | 6/2008 | Thibault et al. |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0183404 A1* | 7/2008 | Emami ................. G01R 31/50 702/34 |
| 2008/0209443 A1 | 8/2008 | Suzuki |
| 2008/0249641 A1 | 10/2008 | Enver et al. |
| 2008/0274766 A1 | 11/2008 | Pratt et al. |
| 2008/0275971 A1 | 11/2008 | Pretlove et al. |
| 2008/0288321 A1 | 11/2008 | Dillon et al. |
| 2008/0297513 A1* | 12/2008 | Greenhill ............... G06Q 99/00 345/440 |
| 2008/0301123 A1 | 12/2008 | Schneider et al. |
| 2008/0301175 A1* | 12/2008 | Applebaum ...... G06F 16/24573 |
| 2009/0048853 A1 | 2/2009 | Hall |
| 2009/0049073 A1 | 2/2009 | Cho |
| 2009/0051526 A1 | 2/2009 | Spear et al. |
| 2009/0059814 A1 | 3/2009 | Nixon et al. |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089233 A1 | 4/2009 | Gach et al. |
| 2009/0089247 A1 | 4/2009 | Blevins et al. |
| 2009/0089359 A1 | 4/2009 | Siorek et al. |
| 2009/0089709 A1 | 4/2009 | Baier et al. |
| 2009/0094531 A1 | 4/2009 | Daniell et al. |
| 2009/0097502 A1 | 4/2009 | Yamamoto |
| 2009/0112335 A1 | 4/2009 | Mehta et al. |
| 2009/0112532 A1 | 4/2009 | Foslien et al. |
| 2009/0198826 A1 | 8/2009 | Ishijima |
| 2009/0210386 A1 | 8/2009 | Cahill |
| 2009/0210802 A1 | 8/2009 | Hawkins et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0254843 A1* | 10/2009 | Van Wie ............... G06F 3/04815 715/757 |
| 2009/0284348 A1 | 11/2009 | Pfeffer |
| 2009/0284383 A1 | 11/2009 | Wiles et al. |
| 2009/0292514 A1 | 11/2009 | McKim et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2009/0327014 A1 | 12/2009 | Labedz et al. |
| 2010/0036779 A1 | 2/2010 | Sadeh-Koniecpol et al. |
| 2010/0069008 A1 | 3/2010 | Oshima et al. |

(56) References Cited

U.S. PATENT DOCUMENTS

| | | |
|---|---|---|
| 2010/0076642 A1 | 3/2010 | Hoffberg et al. |
| 2010/0082132 A1 | 4/2010 | Marruchella et al. |
| 2010/0082158 A1 | 4/2010 | Lakomiak et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0175012 A1 | 7/2010 | Allstrom et al. |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0218010 A1 | 8/2010 | Musti et al. |
| 2010/0222899 A1 | 9/2010 | Blevins et al. |
| 2010/0234969 A1 | 9/2010 | Inoue |
| 2010/0262929 A1 | 10/2010 | Avery |
| 2010/0275135 A1 | 10/2010 | Dunton et al. |
| 2010/0286798 A1 | 11/2010 | Keyes et al. |
| 2010/0290351 A1 | 11/2010 | Toepke et al. |
| 2010/0290359 A1 | 11/2010 | Dewey et al. |
| 2010/0293019 A1 | 11/2010 | Keyes et al. |
| 2010/0293564 A1 | 11/2010 | Gould et al. |
| 2010/0299105 A1 | 11/2010 | Vass et al. |
| 2010/0305736 A1 | 12/2010 | Arduini |
| 2010/0318934 A1 | 12/2010 | Blevins et al. |
| 2010/0332373 A1 | 12/2010 | Crabtree et al. |
| 2011/0019725 A1* | 1/2011 | Keller ............... H04L 5/0042 375/222 |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0072338 A1 | 3/2011 | Caldwell |
| 2011/0093568 A1* | 4/2011 | Thomas ............ H04L 65/4007 709/219 |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0185292 A1 | 7/2011 | Chawla et al. |
| 2011/0191277 A1* | 8/2011 | Agúndez Dominguez ................. G06N 5/025 706/12 |
| 2011/0238189 A1 | 9/2011 | Butera et al. |
| 2011/0258138 A1 | 10/2011 | Kulkarni et al. |
| 2011/0270855 A1 | 11/2011 | Antonysamy |
| 2011/0276896 A1 | 11/2011 | Zambetti et al. |
| 2011/0276908 A1 | 11/2011 | O'Riordan |
| 2011/0279323 A1 | 11/2011 | Hung et al. |
| 2011/0282793 A1 | 11/2011 | Mercuri et al. |
| 2011/0282836 A1* | 11/2011 | Erickson ............ G06F 16/27 707/622 |
| 2011/0295578 A1 | 12/2011 | Aldrich et al. |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0016816 A1 | 1/2012 | Yanase et al. |
| 2012/0029661 A1 | 2/2012 | Jones et al. |
| 2012/0038458 A1* | 2/2012 | Toepke ............ G05B 19/042 340/6.1 |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0197852 A1 | 8/2012 | Dutta et al. |
| 2012/0203728 A1 | 8/2012 | Levine |
| 2012/0210083 A1 | 8/2012 | Lawrence |
| 2012/0226985 A1 | 9/2012 | Chervets et al. |
| 2012/0230309 A1 | 9/2012 | Junk |
| 2012/0236873 A1* | 9/2012 | Steindl ............ H04L 12/4035 370/432 |
| 2012/0239164 A1 | 9/2012 | Smith et al. |
| 2012/0240181 A1 | 9/2012 | McCorkendale et al. |
| 2012/0249588 A1 | 10/2012 | Tison et al. |
| 2012/0251996 A1 | 10/2012 | Jung et al. |
| 2012/0259436 A1 | 10/2012 | Resurreccion et al. |
| 2012/0271962 A1 | 10/2012 | Ivanov et al. |
| 2012/0290795 A1 | 11/2012 | Dowlatkhah |
| 2012/0321273 A1 | 12/2012 | Messmer |
| 2012/0324365 A1 | 12/2012 | Momchilov et al. |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0060354 A1 | 3/2013 | Choi et al. |
| 2013/0086591 A1 | 4/2013 | Haven |
| 2013/0095849 A1 | 4/2013 | Pakzad |
| 2013/0120449 A1 | 5/2013 | Ihara et al. |
| 2013/0124749 A1 | 5/2013 | Thang et al. |
| 2013/0127980 A1 | 5/2013 | Haddick et al. |
| 2013/0138464 A1 | 5/2013 | Kahle et al. |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0151563 A1 | 6/2013 | Addepalli et al. |
| 2013/0159200 A1 | 6/2013 | Paul et al. |
| 2013/0166542 A1 | 6/2013 | Kulkarni et al. |
| 2013/0169526 A1 | 7/2013 | Gai et al. |
| 2013/0171599 A1 | 7/2013 | Bleich et al. |
| 2013/0184847 A1 | 7/2013 | Fruh et al. |
| 2013/0197954 A1 | 8/2013 | Yankelevich et al. |
| 2013/0204959 A1* | 8/2013 | Zhang ............ G06Q 40/04 709/213 |
| 2013/0211555 A1* | 8/2013 | Lawson ............ G05B 19/4185 700/28 |
| 2013/0212129 A1 | 8/2013 | Lawson et al. |
| 2013/0214902 A1 | 8/2013 | Pineau et al. |
| 2013/0217417 A1 | 8/2013 | Mohideen et al. |
| 2013/0231947 A1* | 9/2013 | Shusterman ........ G06F 19/3418 705/2 |
| 2013/0257627 A1 | 10/2013 | Rafael |
| 2013/0265857 A1 | 10/2013 | Foulds et al. |
| 2013/0282150 A1 | 10/2013 | Panther et al. |
| 2013/0318536 A1 | 11/2013 | Fletcher et al. |
| 2013/0321578 A1 | 12/2013 | Dini |
| 2013/0347076 A1 | 12/2013 | Marum et al. |
| 2014/0006338 A1 | 1/2014 | Watson et al. |
| 2014/0015672 A1 | 1/2014 | Ponce |
| 2014/0039648 A1 | 2/2014 | Boult et al. |
| 2014/0067800 A1* | 3/2014 | Sharma ............ G06Q 50/30 707/736 |
| 2014/0078163 A1 | 3/2014 | Cammert et al. |
| 2014/0079297 A1 | 3/2014 | Tadayon et al. |
| 2014/0089504 A1 | 3/2014 | Scholz et al. |
| 2014/0108985 A1 | 4/2014 | Scott et al. |
| 2014/0122026 A1 | 5/2014 | Aberg et al. |
| 2014/0122806 A1 | 5/2014 | Lin et al. |
| 2014/0123115 A1 | 5/2014 | Peretz |
| 2014/0123276 A1 | 5/2014 | Bush et al. |
| 2014/0129002 A1 | 5/2014 | Brandes et al. |
| 2014/0136652 A1 | 5/2014 | Narayanaswami et al. |
| 2014/0156032 A1 | 6/2014 | Jenkins et al. |
| 2014/0164603 A1 | 6/2014 | Castel et al. |
| 2014/0172961 A1 | 6/2014 | Clemmer et al. |
| 2014/0180671 A1 | 6/2014 | Osipova |
| 2014/0180970 A1 | 6/2014 | Hettenkofer et al. |
| 2014/0189520 A1 | 7/2014 | Crepps et al. |
| 2014/0201244 A1 | 7/2014 | Zhou |
| 2014/0207415 A1 | 7/2014 | Bhutani et al. |
| 2014/0229970 A1 | 8/2014 | Besehanic |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |

(56) References Cited

U.S. PATENT DOCUMENTS

| | | |
|---|---|---|
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280338 A1 | 9/2014 | Metz et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0282722 A1 | 9/2014 | Kummer et al. |
| 2014/0297225 A1 | 10/2014 | Petroski et al. |
| 2014/0303754 A1 | 10/2014 | Nixon et al. |
| 2014/0316579 A1 | 10/2014 | Taylor et al. |
| 2014/0335480 A1 | 11/2014 | Asenjo et al. |
| 2014/0358256 A1 | 12/2014 | Billi et al. |
| 2014/0359552 A1 * | 12/2014 | Misra ............... H04L 67/12 717/100 |
| 2014/0372378 A1 | 12/2014 | Long et al. |
| 2014/0372561 A1 | 12/2014 | Hisano |
| 2014/0379296 A1 | 12/2014 | Nathan et al. |
| 2015/0024710 A1 | 1/2015 | Becker et al. |
| 2015/0032743 A1 | 1/2015 | Agrawal |
| 2015/0043626 A1 | 2/2015 | Williams et al. |
| 2015/0067163 A1 | 3/2015 | Bahnsen et al. |
| 2015/0077263 A1 | 3/2015 | Ali et al. |
| 2015/0106578 A1 | 4/2015 | Warfield et al. |
| 2015/0135310 A1 | 5/2015 | Lee |
| 2015/0172872 A1 | 6/2015 | Alsehly et al. |
| 2015/0177718 A1 | 6/2015 | Vartiainen et al. |
| 2015/0185716 A1 | 7/2015 | Wichmann et al. |
| 2015/0188975 A1 | 7/2015 | Hansen et al. |
| 2015/0193418 A1 | 7/2015 | Koska et al. |
| 2015/0199494 A1 | 7/2015 | Koduri et al. |
| 2015/0212679 A1 | 7/2015 | Liu |
| 2015/0220080 A1 | 8/2015 | Nixon et al. |
| 2015/0220311 A1 | 8/2015 | Salter |
| 2015/0221152 A1 | 8/2015 | Andersen |
| 2015/0222666 A1 | 8/2015 | Kumar et al. |
| 2015/0222731 A1 | 8/2015 | Shinohara et al. |
| 2015/0246852 A1 | 9/2015 | Chen et al. |
| 2015/0254330 A1 | 9/2015 | Chan et al. |
| 2015/0261215 A1 | 9/2015 | Blevins et al. |
| 2015/0277399 A1 | 10/2015 | Maturana et al. |
| 2015/0278397 A1 | 10/2015 | Hendrickson et al. |
| 2015/0296324 A1 | 10/2015 | Garaas et al. |
| 2015/0312721 A1 | 10/2015 | Singh et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2016/0261482 A1 | 9/2016 | Mixer et al. |
| 2016/0281607 A1 | 9/2016 | Asati et al. |
| 2016/0327942 A1 | 11/2016 | Nixon et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0102969 A1 | 4/2017 | Kochunni et al. |
| 2017/0103103 A1 | 4/2017 | Nixon et al. |
| 2017/0154073 A1 | 6/2017 | Wu et al. |
| 2017/0154395 A1 | 6/2017 | Podgurny et al. |
| 2017/0199843 A1 | 7/2017 | Nixon et al. |
| 2017/0223075 A1 | 8/2017 | Hong et al. |
| 2017/0235298 A1 | 8/2017 | Nixon et al. |
| 2017/0236067 A1 | 8/2017 | Tjiong |
| 2017/0238055 A1 | 8/2017 | Chang et al. |
| 2017/0255826 A1 | 9/2017 | Chang et al. |
| 2017/0255827 A1 | 9/2017 | Chang et al. |
| 2017/0255828 A1 | 9/2017 | Chang et al. |
| 2017/0255829 A1 | 9/2017 | Chang et al. |
| 2017/0351241 A1 | 12/2017 | Bowers et al. |
| 2018/0012510 A1 | 1/2018 | Asenjo et al. |
| 2018/0151037 A1 | 5/2018 | Morgenthau et al. |
| 2018/0277123 A1 | 9/2018 | Boesen et al. |
| 2018/0343544 A1 | 11/2018 | Fan et al. |
| 2019/0032948 A1 | 1/2019 | Nayak et al. |
| 2020/0324104 A1 | 10/2020 | Labuschagne et al. |

FOREIGN PATENT DOCUMENTS

| | | |
|---|---|---|
| CN | 1232555 A | 10/1999 |
| CN | 1409179 A | 4/2003 |
| CN | 1409232 A | 4/2003 |
| CN | 1494670 A | 5/2004 |
| CN | 1537258 A | 10/2004 |
| CN | 1589423 A | 3/2005 |
| CN | 1757002 A | 4/2006 |
| CN | 1804744 A | 7/2006 |
| CN | 1805040 A | 7/2006 |
| CN | 1826565 A | 8/2006 |
| CN | 1864156 A | 11/2006 |
| CN | 1917423 A | 2/2007 |
| CN | 1950771 A | 4/2007 |
| CN | 1980194 A | 6/2007 |
| CN | 101094056 A | 12/2007 |
| CN | 101097136 A | 1/2008 |
| CN | 101169799 A | 4/2008 |
| CN | 101187869 A | 5/2008 |
| CN | 101221415 A | 7/2008 |
| CN | 101233461 A | 7/2008 |
| CN | 101321165 A | 12/2008 |
| CN | 101387882 A | 3/2009 |
| CN | 101410824 A | 4/2009 |
| CN | 101449259 A | 6/2009 |
| CN | 201374004 Y | 12/2009 |
| CN | 101713985 A | 5/2010 |
| CN | 101788820 A | 7/2010 |
| CN | 101802736 A | 8/2010 |
| CN | 101822050 A | 9/2010 |
| CN | 101828195 A | 9/2010 |
| CN | 101867566 A | 10/2010 |
| CN | 102063097 A | 5/2011 |
| CN | 102073448 A | 5/2011 |
| CN | 102124432 A | 7/2011 |
| CN | 102169182 A | 8/2011 |
| CN | 102175174 A | 9/2011 |
| CN | 102184489 A | 9/2011 |
| CN | 102200993 A | 9/2011 |
| CN | 102204305 A | 9/2011 |
| CN | 102213959 A | 10/2011 |
| CN | 102239452 A | 11/2011 |
| CN | 102243315 A | 11/2011 |
| CN | 102278987 A | 12/2011 |
| CN | 102299909 A | 12/2011 |
| CN | 202101268 U | 1/2012 |
| CN | 102349031 A | 2/2012 |
| CN | 102375453 A | 3/2012 |
| CN | 102378989 A | 3/2012 |
| CN | 102402215 A | 4/2012 |
| CN | 102436205 A | 5/2012 |
| CN | 102494630 A | 6/2012 |
| CN | 102494683 A | 6/2012 |
| CN | 102637027 A | 8/2012 |
| CN | 102640156 A | 8/2012 |
| CN | 102707689 A | 10/2012 |
| CN | 102710861 A | 10/2012 |
| CN | 102725933 A | 10/2012 |
| CN | 102780568 A | 11/2012 |
| CN | 102801779 A | 11/2012 |
| CN | 102867237 A | 1/2013 |
| CN | 102884779 A | 1/2013 |
| CN | 103106188 A | 5/2013 |
| CN | 103257626 A | 8/2013 |

(56) References Cited

FOREIGN PATENT DOCUMENTS

| | | |
|---|---|---|
| CN | 103403686 A | 11/2013 |
| CN | 103429181 A | 12/2013 |
| CN | 103562809 A | 2/2014 |
| CN | 103576638 A | 2/2014 |
| CN | 103699698 A | 4/2014 |
| CN | 103863948 A | 6/2014 |
| CN | 104035392 A | 9/2014 |
| CN | 104049575 A | 9/2014 |
| CN | 104049594 A | 9/2014 |
| CN | 104203078 A | 12/2014 |
| CN | 104808603 A | 7/2015 |
| CN | 105051760 A | 11/2015 |
| DE | 19882113 T1 | 1/2000 |
| DE | 19882117 T1 | 1/2000 |
| EP | 0 308 390 A1 | 3/1989 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 1 965 316 A2 | 9/2008 |
| EP | 1 994 458 A2 | 11/2008 |
| EP | 2 003 813 A1 | 12/2008 |
| EP | 2 112 614 A1 | 10/2009 |
| EP | 2 180 441 A1 | 4/2010 |
| EP | 2 256 679 A1 | 12/2010 |
| EP | 2 469 475 A1 | 6/2012 |
| EP | 1 344 291 B1 | 8/2012 |
| EP | 2 685 329 A1 | 1/2014 |
| EP | 2 704 401 A1 | 3/2014 |
| EP | 2 746 884 A1 | 6/2014 |
| EP | 2 801 939 A1 | 11/2014 |
| FR | 2 897 453 A1 | 8/2007 |
| FR | 2 966 625 A1 | 4/2012 |
| GB | 2 336 977 B | 11/1999 |
| GB | 2 347 234 A | 8/2000 |
| GB | 2 336 923 B | 6/2002 |
| GB | 2 403 028 A | 12/2004 |
| GB | 2 452 635 A | 3/2009 |
| GB | 2 453 426 A | 4/2009 |
| GB | 2 485 092 A | 5/2012 |
| GB | 2 494 778 A | 3/2013 |
| GB | 2 512 984 A | 10/2014 |
| GB | 2 512 997 A | 10/2014 |
| GB | 2 514 644 A | 12/2014 |
| GB | 2 518 921 A | 4/2015 |
| GB | 2 532 849 A | 6/2016 |
| GB | 2 534 628 A | 8/2016 |
| GB | 2 536 339 A | 9/2016 |
| GB | 2 537 457 A | 10/2016 |
| GB | 2 548 021 A | 9/2017 |
| JP | 64-017105 A | 1/1989 |
| JP | 01-291303 A | 11/1989 |
| JP | H4-274725 A | 9/1992 |
| JP | 05-073131 A | 3/1993 |
| JP | 05-142033 A | 6/1993 |
| JP | 05-187973 A | 7/1993 |
| JP | 05-346807 A | 12/1993 |
| JP | 06-052145 A | 2/1994 |
| JP | 06-307897 A | 11/1994 |
| JP | 08-234951 | 9/1996 |
| JP | 9-160798 A | 6/1997 |
| JP | 9-196714 A | 7/1997 |
| JP | 09-330861 A | 12/1997 |
| JP | H9-330861 A | 12/1997 |
| JP | 10-116113 A | 5/1998 |
| JP | H10-222222 A | 8/1998 |
| JP | 10-326111 A | 12/1998 |
| JP | 11-327628 A | 11/1999 |
| JP | 2000-122715 A | 4/2000 |
| JP | 2000-194414 A | 7/2000 |
| JP | 2000-214914 A | 8/2000 |
| JP | 2001-036542 A | 2/2001 |
| JP | 2001-195123 A | 7/2001 |
| JP | 2001-512593 A | 8/2001 |
| JP | 2001-265821 A | 9/2001 |
| JP | 2002-010489 A | 1/2002 |
| JP | 2002-024423 A | 1/2002 |
| JP | 2002-99325 A | 4/2002 |
| JP | 2002-244725 A | 8/2002 |
| JP | 2002-278619 A | 9/2002 |
| JP | 2002-287801 A | 10/2002 |
| JP | 2002-335591 A | 11/2002 |
| JP | 2003-029818 A | 1/2003 |
| JP | 2003-067523 A | 3/2003 |
| JP | 2003-109152 A | 4/2003 |
| JP | 2003-140741 A | 5/2003 |
| JP | 2003-167621 A | 6/2003 |
| JP | 2003-167624 A | 6/2003 |
| JP | 2003-177818 A | 6/2003 |
| JP | 2003-250232 A | 9/2003 |
| JP | 2003-295944 A | 10/2003 |
| JP | 2003-337794 A | 11/2003 |
| JP | 2003-345431 A | 12/2003 |
| JP | 2004-08596 A | 1/2004 |
| JP | 2004-21583 A | 1/2004 |
| JP | 2004-030492 A | 1/2004 |
| JP | 2004-038596 A | 2/2004 |
| JP | 2004-102765 A | 4/2004 |
| JP | 2004-171127 A | 6/2004 |
| JP | 2004-199624 A | 7/2004 |
| JP | 2004-227561 A | 8/2004 |
| JP | 2004-265302 A | 9/2004 |
| JP | 2004-265411 A | 9/2004 |
| JP | 2004-348582 A | 12/2004 |
| JP | 2004-537820 A | 12/2004 |
| JP | 2005-100072 A | 4/2005 |
| JP | 2005-102239 A | 4/2005 |
| JP | 2005-107758 A | 4/2005 |
| JP | 2005-216137 A | 8/2005 |
| JP | 2005-242830 A | 9/2005 |
| JP | 2005-293600 A | 10/2005 |
| JP | 2005-301546 A | 10/2005 |
| JP | 2005-332093 A | 12/2005 |
| JP | 2006-146749 A | 6/2006 |
| JP | 2006-172462 A | 6/2006 |
| JP | 2006-185120 A | 7/2006 |
| JP | 2006-221376 A | 8/2006 |
| JP | 2006-221563 A | 8/2006 |
| JP | 2006-260411 A | 9/2006 |
| JP | 2006-527426 A | 11/2006 |
| JP | 2007-012088 A | 1/2007 |
| JP | 2007072552 | 3/2007 |
| JP | 2007-87387 A | 4/2007 |
| JP | 2007-137563 A | 6/2007 |
| JP | 2007-148938 A | 6/2007 |
| JP | 2007-164764 A | 6/2007 |
| JP | 2007-207065 A | 8/2007 |
| JP | 2007-242000 A | 9/2007 |
| JP | 2007-286798 A | 11/2007 |
| JP | 2007-299228 A | 11/2007 |
| JP | 2007-536631 A | 12/2007 |
| JP | 2007-536648 A | 12/2007 |
| JP | 2008-009793 A | 1/2008 |
| JP | 2008-503012 A | 1/2008 |
| JP | 2008-065821 A | 3/2008 |
| JP | 2008-158971 A | 7/2008 |
| JP | 2008-171152 A | 7/2008 |
| JP | 2008-177929 A | 7/2008 |
| JP | 2008-250805 A | 10/2008 |
| JP | 2008-269489 A | 11/2008 |
| JP | 2008-305419 A | 12/2008 |
| JP | 2009-20787 A | 1/2009 |
| JP | 2009-500767 A | 1/2009 |
| JP | 2009-044288 A | 2/2009 |
| JP | 2009-53938 A | 3/2009 |
| JP | 2009-064451 A | 3/2009 |
| JP | 2009-135892 A | 6/2009 |
| JP | 2009-140380 A | 6/2009 |
| JP | 2009-211522 A | 9/2009 |
| JP | 2009-251777 A | 10/2009 |
| JP | 2009-538567 A | 11/2009 |
| JP | 2010-15205 A | 1/2010 |
| JP | 2010-181949 A | 8/2010 |

(56) References Cited

FOREIGN PATENT DOCUMENTS

| | | |
|---|---|---|
| JP | 2010-527486 A | 8/2010 |
| JP | 2010-250825 A | 11/2010 |
| JP | 2011-022920 A | 2/2011 |
| JP | 2011-034564 A | 2/2011 |
| JP | 2011-180629 A | 9/2011 |
| JP | 2011-204237 A | 10/2011 |
| JP | 2011-204238 A | 10/2011 |
| JP | 2012-022558 A | 2/2012 |
| JP | 2012-048762 A | 3/2012 |
| JP | 2012-069118 A | 4/2012 |
| JP | 2012-084162 A | 4/2012 |
| JP | 4-934482 B2 | 5/2012 |
| JP | 2012-88953 A | 5/2012 |
| JP | 2012-138044 A | 7/2012 |
| JP | 2012-190477 A | 10/2012 |
| JP | 2012-215547 A | 11/2012 |
| JP | 2012-234451 A | 11/2012 |
| JP | 2012-527059 A | 11/2012 |
| JP | 2012-242982 A | 12/2012 |
| JP | 2012-252604 A | 12/2012 |
| JP | 2013-15899 A | 1/2013 |
| JP | 2013020484 A | 1/2013 |
| JP | 2013-041596 A | 2/2013 |
| JP | 2013-512496 A | 4/2013 |
| JP | 2013-175108 A | 9/2013 |
| JP | 2014-116027 A | 6/2014 |
| JP | 2014-170552 A | 9/2014 |
| JP | 2014-523579 A | 9/2014 |
| JP | 2014-225237 A | 12/2014 |
| JP | 2015-146183 A | 8/2015 |
| JP | 2015-156104 A | 8/2015 |
| JP | 2015-176609 A | 10/2015 |
| KR | 10-2015-0112357 A | 10/2015 |
| TW | 201408020 A | 2/2014 |
| WO | WO-02/35302 A1 | 5/2002 |
| WO | WO-02/50971 | 6/2002 |
| WO | WO-03/073344 A2 | 9/2003 |
| WO | WO-03/073688 A1 | 9/2003 |
| WO | WO-2003/073688 A1 | 9/2003 |
| WO | WO-2005/083533 A1 | 9/2005 |
| WO | WO-2005/109123 A1 | 11/2005 |
| WO | WO-2007/052342 A1 | 5/2007 |
| WO | WO-2007/109082 A2 | 9/2007 |
| WO | WO-2008/042786 A2 | 4/2008 |
| WO | WO-2009/021900 A1 | 2/2009 |
| WO | WO-2009/046095 A1 | 4/2009 |
| WO | WO-2010/041462 A1 | 4/2010 |
| WO | WO-2011/054029 A1 | 5/2011 |
| WO | WO-2011/120625 A1 | 10/2011 |
| WO | WO-2012/022381 A1 | 2/2012 |
| WO | WO-2012/016012 A2 | 2/2012 |
| WO | WO-2012/022358 A1 | 2/2012 |
| WO | WO-2012/096877 A1 | 7/2012 |
| WO | WO-2012/129400 A2 | 9/2012 |
| WO | WO-2012/177812 A1 | 12/2012 |
| WO | WO-2013/007866 A1 | 1/2013 |
| WO | WO-2014/005073 A1 | 1/2014 |
| WO | WO-2014/145801 A2 | 9/2014 |
| WO | WO-2015/132199 A1 | 9/2015 |
| WO | WO-2015/138706 A1 | 9/2015 |
| WO | WO-2016/057365 A1 | 4/2016 |

OTHER PUBLICATIONS

First Office Action for Chinese Application No. 201410097872.4, dated Aug. 23, 2017.
First Office Action for Chinese Application No. 201510049715.0, dated May 4, 2018.
Notice of Reasons for Rejection for Japanese Application No. 2014-049915, dated Mar. 13, 2018.
Notice of Reasons for Rejection for Japanese Application No. 2014-049916, dated Feb. 27, 2018.
Notice of Reasons for Rejection for Japanese Application No. 2014-049918, dated Apr. 10, 2018.
Notice of Reasons for Rejection for Japanese Application No. 2014-051596, dated Jan. 16, 2018.
Notice of Reasons for Rejection for Japanese Application No. 2014-051598, dated Mar. 13, 2018.
Notice of Reasons for Rejection for Japanese Application No. 2016-503431, dated Apr. 3, 2018.
Second Office Action for Chinese Application No. 201410088828.7, dated Apr. 27, 2018.
Second Office Action for Chinese Application No. 201410097675.2, dated Feb. 11, 2018.
Second Office Action for Chinese Application No. 201410097873.9, dated May 15, 2018.
Second Office Action for Chinese Application No. 201410097875.8, dated Jun. 6, 2018.
Second Office Action for Chinese Application No. 201410098327.7, dated Feb. 27, 2018.
First Office Action for Chinese Application No. 201410080524.6, dated Sep. 13, 2017.
First Office Action for Chinese Application No. 201410088828.7, dated Aug. 1, 2017.
First Office Action for Chinese Application No. 201410097623.5, dated Sep. 26, 2017.
First Office Action for Chinese Application No. 201410097873.9, dated Aug. 9, 2017.
First Office Action for Chinese Application No. 201410097874.3, dated Aug. 18, 2017.
First Office Action for Chinese Application No. 201410097921.4, dated Oct. 10, 2017.
First Office Action for Chinese Application No. 201410097922.9, dated Aug. 18, 2017.
First Office Action for Chinese Application No. 201410097923.3, dated Aug. 28, 2017.
First Office Action for Chinese Application No. 201410098326.2, dated Jul. 27, 2017.
First Office Action for Chinese Application No. 201410098327.7, dated Jul. 26, 2017.
First Office Action for Chinese Application No. 201410098982.2, dated Aug. 9, 2017.
First Office Action for Chinese Application No. 201410099103.8, dated Aug. 9, 2017.
Notice of Reasons for Rejection for Japanese Application No. 2014-051599, dated Nov. 28, 2017.
Notification of First Office Action for Chinese Application No. 201410099068.X, dated Sep. 15, 2017.
"ANSI/ISA-S5.Apr. 1991 American National Standard Instrument Loop Diagrams" by Instrument Society of America, 1986, 22 pages.
"Control Loop Foundation—Batch and Continuous Processes", by Terrence Blevins and Mark Nixon, *International Society of Automation*, 2011, Chapter 7.
"IoT and Big Data Combine Forces," (2013). Retrieved from the Internet at: <URL:http://wiki.advantech.com/images/7/73/iot2013_whitepaper.pdf>.
Bassat et al., "Workflow Management Combined with Diagnostic and Repair Expert System Tools for Maintenance Operations," IEEE, pp. 367-375 (1993).
Bryner, "Smart Manufacturing: The Next Revolution," Chemical Engineering Process (2012). Retrieved from the Internet at: <URL:http://www.aiche.org/sites/default/files/cep/20121004a.pdf>.
Building Smarter Manufacturing with the Internet of Things (IoT), (2014). Retrieved from the Internet at: <URL:http://www.cisco.com/web/solutions/trends/iot/iot_in_manufacturing_january.pdf>.
Communication Relating to the Results of the Partial International Search, dated Jul. 11, 2014.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
International Search Report and Written Opinion for Application No. PCT/US2014/030627, dated Sep. 11, 2014.
International Search Report and Written Opinion for Application No. PCT/U.S. Pat. No. 2015,053931, dated Jan. 26, 2016.

(56) References Cited

OTHER PUBLICATIONS

International Search Report and Written Opinion for Application No. PCT/US2015/020148, dated Jun. 18, 2015.
Krumeich et al., "Big Data Analytics for Predictive Manufacturing Control—A Case Study from Process Industry," IEEE International Congress on Big Data, pp. 530-537 (2014).
Notice of Reasons for Rejection for Japanese Application No. 2010-229513, dated Jul. 29, 2014.
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.
Search Report for Application No. GB1501042.4, dated Feb. 2, 2016.
Search Report for Application No. GB1513617.9, dated Jan. 21, 2016.
Search Report for Application No. GB1517034.3, dated May 26, 2016.
Search Report for Application No. GB1517038.4, dated Mar. 22, 2016.
Smalley, "GE Invests in Project to Embed Predictive Analytics in Industrial Internet," (2013). Retrieved from the Internet at: <URL:http://data-informed.com/ge-invents-in-project-to-embed-predictive-analytics-in-industrial-internet/>.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/174,413, filed Feb. 6, 2014, "Collecting and Delivering Data to a Big Data Machine in a Process Control System".
U.S. Appl. No. 14/212,411, filed Mar. 14, 2014, "Determining Associations and Alignments of Process Elements and Measurements in a Process".
U.S. Appl. No. 14/212,493, filed Mar. 14, 2014, "Distributed Big Data in a Process Control System".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: <http://forbes.com/sites/bwoo/2013/02/27/intel-drops-a-big-data-shocker/?partner=ya>dated Feb. 27, 2013.
Examination Report for Application No. EP 14724871.0, dated Aug. 17, 2016.
U.S. Office Action for U.S. Appl. No. 13/784,041 dated Apr. 6, 2015.
U.S. Office Action for U.S. Appl. No. 13/784,041 dated Feb. 26, 2016.
U.S. Office Action for U.S. Appl. No. 13/784,041 dated Oct. 15, 2015.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mahdavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).
Notice of Reasons for Rejection for Japanese Application No. 2014-048411, dated Dec. 5, 2017.
Notice of Reasons for Rejection for Japanese Application No. 2014-049919, dated Nov. 29, 2017.
Notice of Reasons for Rejection for Japanese Application No. 2014-049918, dated Dec. 12, 2017.
Notice of Reasons for Rejection for Japanese Application No. 2014-041785, dated Nov. 30, 2017.
Notice of Reasons for Rejection for Japanese Application No. 2014-048410, dated Dec. 29, 2017.
Notice of Reasons for Rejection for Japanese Application No. 2014-041785, dated Dec. 5, 2017.
Decision of Refusal for Japanese Application No. 2014-048410, dated May 29, 2018.
Decision of Rejection for Chinese Application No. 201410097675.2, dated Jul. 2, 2018.
Examination Report for Application No. EP 14724871.0, dated Aug. 10, 2018.
First Office Action for Chinese Application No. 201510113223.3, dated Jul. 4, 2018.
First Office Action for Chinese Application No. 201580014241.4, dated Jun. 22, 2018.
Notice of Reasons for Rejection for Japanese Application No. 2014-048411, dated Jul. 31, 2018.
Notice of Reasons for Rejection for Japanese Application No. 2014-049919, dated Jul. 31, 2018.
Notice of Reasons for Rejection for Japanese Application No. 2014-049920, dated Jun. 5, 2018.
Notice of Reasons for Rejection for Japanese Application No. 2014-051595, dated May 29, 2018.
Notice of Reasons for Rejection for Japanese Application No. 2014-051596, dated May 29, 2018.
Second Office Action for Chinese Application No. 201410097623.5, dated Jun. 26, 2018.
Second Office Action for Chinese Application No. 201410097872.4 dated Jul. 12, 2018.
Second Office Action for Chinese Application No. 201410097921.4, dated Jul. 5, 2018.

(56) References Cited

OTHER PUBLICATIONS

Second Office Action for Chinese Application No. 201410098326.2, dated Jun. 19, 2018.
Second Office Action for Chinese Application No. 201410098982.2, dated Jun. 11, 2018.
Second Office Action for Chinese Application No. 201410099068.X, dated Jun. 14, 2018.
Second Office Action for Chinese Application No. 201410099103.8, dated Jun. 5, 2018.
Third Office Action for Chinese Application No. 201410097922.9, dated Aug. 3, 2018.
Dongargaonkar et al., "PLC Based Ignition System," Conference Records of the 1999 IEEE Industry Application Conference, 1380-1387 (1999).
International Preliminary Reporton Patentability for Application No. PCT/US2015/020148, dated Sep. 14, 2016.
Aouada et al., "Source Detection and Separation in Power Plant Process Monitoring: Application of the Bootstrap," IEEE International Conference on Acoustics Speech and Signal Processing Proceedings (2006).
Bruzzone et al., "Different Modeling and Simulation Approaches Applied to Industrial Process Plants," Proceedings of the Emerging M&S Applications in Industry & Academia/Modeling and Humanities Symposium (2013).
Extended European Search Report for Application No. 17157505.3, dated Jun. 30, 2017.
First Office Action for Chinese Application No. 201410097675.2, dated May 10, 2017.
International Preliminary Reporton Patentability for Application No. PCT/US2015/053931, dated Apr. 11, 2017.
Notification of First Office Action for Chinese Application No. 201410097875.8, dated Jul. 7, 2017.
Sailer et al., "Attestation-Based Policy Enforcement for Remote Access," Proceedings of the 11th ACM Conference on Computer and Communications Security (2004).
Search Report for Application No. GB1617020.1, dated Apr. 13, 2017.
Search Report for Application No. GB1617021.9, dated Apr. 5, 2017.
Search Report for Application No. GB1617022.7, dated Apr. 18, 2017.
Search Report for Application No. GB1617023.5, dated Apr. 7, 2017.
Search Report for Application No. GB16702014.0, dated Aug. 3, 2017.
Sunindyo et al., "An Event-Based Empirical Process Analysis Framework," ESEM (2010).
Notice of Reasons for Rejection for Japanese Application No. 2014-048412, dated Feb. 27, 2018.
Notice of Reasons for Rejection for Japanese Application No. 2014-049917, dated Mar. 6, 2018.
Notice of Reasons for Rejection for Japanese Application No. 2014-049920, dated Feb. 20, 2018.
Notice of Reasons for Rejection for Japanese Application No. 2014-051114, dated Dec. 28, 2017.
Notice of Reasons for Rejection for Japanese Application No. 2014-051595, dated Jan. 16, 2018.
Notice of Reasons for Rejection for Japanese Application No. 2014-051596, dated Jan. 9, 2018.
Notice of Reasons for Rejection for Japanese Application No. 2014-051597, dated Jan. 9, 2018.
Second Office Action for Chinese Application No. 201410097922.9, dated Jan. 9, 2018.
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: <URL:http://www.chemicalprocessing.com/articles/2008/245/?show=all>.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
Decision of Refusal for Japanese Application No. 2014-048412, dated Oct. 26, 2018.
Decision of Refusal for Japanese Application No. 2014-051597, dated Nov. 13, 2018.
Decision of Rejection for Chinese Application No. 201410097873.9, dated Dec. 5, 2018.
Decision of Rejection for Chinese Application No. 201410098982.2, dated Jan. 23, 2019.
First Office Action for Chinese Application No. 201510640227.7, dated Mar. 15, 2019.
First Office Action for Chinese Application No. 201510640439.5, dated Feb. 25, 2019.
First Office Action for Chinese Application No. 201510641015.0, dated Feb. 27, 2019.
First Office Action for Chinese Application No. 201580054441.2, dated Feb. 27, 2019.
Notice of Reasons for Rejection for Japanese Application No. 2014-051114, dated Mar. 5, 2019.
Notice of Reasons for Rejection for Japanese Application No. 2014-051598, dated Nov. 13, 2018.
Notice of Reasons for Rejection for Japanese Application No. 2015-015738, dated Mar. 12, 2019.
Notice of Reasons for Rejection for Japanese Application No. 2015-159015, dated Mar. 19, 2019.
Notice of Reasons for Rejection for Japanese Application No. 2016-503431, dated Jan. 8, 2019.
Third Office Action for Chinese Application No. 201410098326.2, dated Jan. 17, 2019.
Third Office Action for Chinese Application No. 201410099068.X, dated Jan. 16, 2019.
Decision of Refusal for Japanese Application No. 2014-049918, dated Aug. 21, 2018.
Decision of Refusal for Japanese Application No. 2014-051595, dated Sep. 11, 2018.
Decision of Refusal for Japanese Application No. 2014-051596, dated Oct. 23, 2018.
Examination Report for Application No. GB1402311.3, dated Sep. 28, 2018.
Examination Report for Application No. GB14724871.0, dated Oct. 8, 2018.
Final Rejection for Japanese Application No. 2014-049915, dated Nov. 6, 2018.
Notice of Reasons for Rejection for Japanese Application No. 2014-049916, dated Aug. 28, 2018.
Notice of Reasons for Rejection for Japanese Application No. 2014-049917, dated Dec. 4, 2018.

(56) References Cited

OTHER PUBLICATIONS

Notice of Reasons for Rejection for Japanese Application No. 2014-049920, dated Oct. 23, 2018.
Notice of Reasons for Rejection for Japanese Application No. 2014-051597, dated Jul. 31, 2018.
Third Office Action for Chinese Application No. 201410098327.7, dated Sep. 30, 2018.
Zhu et al., "Localization Optimization Algorithm of Maximum Likelihood Estimation Based on Received Signal Strength," IEEE 9th International Conference on Communication Software and Networks (ICCSN), pp. 830-834 (2017).
Decision of Refusal for Japanese Application No. 2014-041785, dated May 7, 2019.
Decision of Refusal for Japanese Application No. 2014-048411, dated Mar. 1, 2019.
Decision of Refusal for Japanese Application No. 2014-049920, dated Apr. 9, 2019.
Examination Report for Application No. GB1402311.3, dated Aug. 6, 2019.
Examination Report for Application No. GB1901546.0, dated Aug. 6, 2019.
Fourth Office Action for Chinese Application No. 201410098327.7, dated Mar. 28, 2019.
Notice of Reasons for Rejection for Japanese Application No. 2015-015738, dated Jun. 18, 2019.
Notice of Reasons for Rejection for Japanese Application No. 2015-052138, dated May 13, 2019.
Notice of Reasons for Rejection for Japanese Application No. 2016-557216, dated May 14, 2019.
Search Report for Application No. GB1503743.5, dated Apr. 25, 2019.
Examination Report for Application No. GB1403471.4, dated Apr. 23, 2020.
Examination Report for Application No. GB1403472.2, dated May 11, 2020.
Examination Report for Application No. GB1403475.5, dated Apr. 22, 2020.
Examination Report for Application No. GB1403476.3, dated Apr. 15, 2020.
Examination Report for Application No. GB1403617.2, dated Jun. 2, 2020.
Examination Report for Application No. GB1517034.3, dated Jul. 1, 2020.
Examination Report for Application No. GB1517035.0, dated Apr. 30, 2020.
Examination Report for Application No. GB1704515.4, dated May 11, 2020.
Notice of Reasons for Refusal for Japanese Application No. 2014-049915, dated Jun. 9, 2020.
Notice of Reasons for Rejection for Japanese Application No. 2014-041785, dated Mar. 10, 2020.
Notice of Reasons for Rejection for Japanese Application No. 2019-009298, dated Feb. 18, 2020.
Notice of Reasons for Rejection for Japanese Application No. 2019-031511, dated Apr. 22, 2020.
Notice of Reasons for Rejection for Japanese Application No. 2019-031511, dated Apr. 28, 2020.
Notice of Reasons for Rejection for Japanese Application No. 2019-058143, dated May 19, 2020.
Notification of Reexamination for Chinese Application No. 201410098982.2, dated May 20, 2020.
Third Office Action for Chinese Application No. 201510641015.0, dated May 22, 2020.
Decision of Rejection for Chinese Application No. 201410098326.2, dated Jul. 3, 2019.
Examination Report for Application No. EP 17157505.3, dated Sep. 6, 2019.
Examination Report for Application No. GB1403251.0, dated Oct. 10, 2019.
Examination Report for Application No. GB1403406.0, dated Mar. 26, 2020.
Examination Report for Application No. GB1403407.8, dated Dec. 2, 2019.
Examination Report for Application No. GB1403407.8, dated Feb. 24, 2020.
Examination Report for Application No. GB1403408.6, dated Mar. 26, 2020.
Examination Report for Application No. GB1403471.4, dated Nov. 15, 2019.
Examination Report for Application No. GB1403472.2, dated Nov. 19, 2019.
Examination Report for Application No. GB1403474.8, dated Dec. 3, 2019.
Examination Report for Application No. GB1403475.5, dated Nov. 12, 2019.
Examination Report for Application No. GB1403476.3, dated Nov. 4, 2019.
Examination Report for Application No. GB1403477.1, dated Nov. 7, 2019.
Examination Report for Application No. GB1403478.9, dated Nov. 21, 2019.
Examination Report for Application No. GB1403480.5, dated Mar. 27, 2020.
Examination Report for Application No. GB1403480.5, dated Oct. 24, 2019.
Examination Report for Application No. GB1403615.6, dated Nov. 20, 2019.
Examination Report for Application No. GB1403616.4, dated Nov. 15, 2019.
Examination Report for Application No. GB1403617.2, dated Nov. 28, 2019.
Examination Report for Application No. GB1517038.4, dated Mar. 10, 2020.
Examination Report for Application No. GB1 614666.4 dated Jan. 6, 2020.
Notice of Reasons for Refusal for Japanese Application No. 2017-518462, dated Mar. 10, 2020.
Notice of Reasons for Rejection for Japanese Application No. 2014-048410, dated Jan. 14, 2020.
Notice of Reasons for Rejection for Japanese Application No. 2014-048412, dated Nov. 26, 2019.
Notice of Reasons for Rejection for Japanese Application No. 2014-051595, dated Dec. 10, 2019..
Notice of Reasons for Rejection for Japanese Application No. 2014-051596, dated Dec. 3, 2019.
Notice of Reasons for Rejection for Japanese Application No. 2014-051598, dated Jul. 30, 2019.
Notice of Reasons for Rejection for Japanese Application No. 2015-052138, dated Nov. 5, 2019.
Notice of Reasons for Rejection for Japanese Application No. 2015-159015, dated Aug. 27, 2019.
Notice of Reasons for Rejection for Japanese Application No. 2015-198444, dated Sep. 3, 2019.
Notice of Reasons for Rejection for Japanese Application No. 2015-198445, dated Aug. 27, 2019.
Notice of Reasons for Rejection for Japanese Application No. 2015-198446, dated Dec. 17, 2019.
Notice of Reasons for Rejection for Japanese Application No. 2016-557216, dated Dec. 10, 2019.
Notice of Reasons for Rejection for Japanese Application No. 2017-518462, dated Oct. 8, 2019.
Notice of Reasons for Rejection for Japanese Application No. 2018-017060, dated Oct. 15, 2019.
Notice of Reasons for Rejection for Japanese Application No. 2018-239741, dated Jan. 28, 2020.
Notice of Reasons for Rejection for Japanese Application No. 2019-002497, dated Nov. 25, 2019.
Notice of Reasons for Rejection for Japanese Application No. 2019-003424, dated Feb. 3, 2020.
Notice of Reasons for Rejection for Japanese Application No. 2019-003425, dated Feb. 3, 2020.

(56) References Cited

OTHER PUBLICATIONS

Notice of Reasons for Rejection for Japanese Application No. 2019-045165, dated Mar. 3, 2020.
Notice of Reasons for Rejection for Japanese Application No. 2019-045165, dated Nov. 6, 2019.
Notification of Reexamination for Chinese Application No. 201410099103.8, dated Dec. 16, 2019.
Notification of Reexamination for Chinese Application No. 201410099103.8, dated Mar. 5, 2020.
Second Office Action for Chinese Application No. 201510640227.7, dated Nov. 26, 2019.
Second Office Action for Chinese Application No. 201510640439.5, dated Nov. 12, 2019.
Second Office Action for Chinese Application No. 201510641015.0, dated Nov. 8, 2019.
Second Office Action for Chinese Application No. 201580054441.2, dated Nov. 15, 2019.
Tomoyuki Tanabe, "Comparative evaluation of information dissemination methods for effective and efficient information sharing in wireless sensor networks," 2011 Research Report of the Information Processing Society of Japan [CD-ROM], Japan, Information Processing Society of Japan, Aug. 15, 2011.
Notice of Reasons for Refusal for Japanese Application No. 2015-198446, dated Jul. 21, 2020.
Notification of First Office Action for Chinese Application No. 201711155833.5, dated Jul. 13, 2020.
Notification of First Office Action for Chinese Application No. 201610885816.6, dated Jul. 3, 2020.
Notice of Reasons for Rejection for Japanese Application No. 2019-003425, dated Jul. 21, 2020.
Notification of First Office Action for Chinese Application No. 201610885292.0, dated Jul. 13, 2020.
Examination Report for Application No. GB1403471.4, dated Sep. 9, 2020.
Notice of Reasons for Rejection for Japanese Application No. 2019-129152, dated Jul. 7, 2020.
Notification of First Office Action for Chinese Application No. 201610885273.8 dated Aug. 4, 2020.
Notification of First Office Action for Chinese Application No. 201610885758.7 dated Jul. 22, 2020.
Decision of Refusal for Japanese Application No. 2015-052138, dated Aug. 18, 2020.
Examination Report for Application No. GB1517038.4, dated Sep. 16, 2020.
Notification of First Office Action for Chinese Application No. 201610885149.1, dated Jun. 28, 2020.
Final Decision for Japanese Application No. 2017-518462, dated Sep. 23, 2020.
Notice of Reasons for Rejection for Japanese Application No. 2016-198938, dated Oct. 13, 2020.
Examination Report for Application No. GB1517035.0, dated Oct. 20, 2020.
Examination Report for Application No. GB1704515.4, dated Oct. 13, 2020.
Notice of Reasons for Rejection for Japanese Application No. 2014-48412, dated Sep. 29, 2020.
Notice of Reasons for Rejection for Japanese Application No. 2016-198942, dated Oct. 13, 2020.
Notice of Reasons for Rejection for Japanese Application No. 2016-198939, dated Oct. 20, 2020.
Notification of First Office Action for Chinese Application No. 201710074207.7 dated Oct. 9, 2020.
Rattanasawad et al., "A Review and Comparison of Rule Languages and Rule-Based Inference Engines for the Semantic Web," 2013 International Computer Science and Engineering Conference (2013).
Combined Search and Examination Report for Application No. GB2009011.4, dated Nov. 30, 2020.
Decision of Refusal for Japanese Application No. 2018-239741, dated Sep. 29, 2020.
Combined Search and Examination Report for Application No. GB2017838.0, dated Dec. 7, 2020.
Examination Report for Application No. GB1617020.1, dated Dec. 4, 2020.
Office Action for Japanese Patent Application No. 2019-163650, dated Sep. 29, 2020.
Notice of Reasons for Rejection for Japanese Application No. 2016-198941, dated Nov. 13, 2020.
Notice of Reasons for Rejection for Japanese Application No. 2019-002497, dated Sep. 29, 2020.
Notice of Reasons for Rejection for Japanese Application No. 2019-184272, dated Dec. 1, 2020.
Notice of Reasons for Rejection for Japanese Application No. 2019-184275, dated Dec. 1, 2020.
Notice of Reasons for Rejection for Japanese Application No. 2020-002186, dated Nov. 13, 2020.
Combined Search and Examination Report for Application No. GB2016319.2, dated Apr. 15, 2021.
Combined Search and Examination Report for Application No. GB2017946.1, dated Feb. 23, 2021.
Combined Search and Examination Report for Application No. GB2017947.9, dated Feb. 23, 2021.
Combined Search and Examination Report for Application No. GB2108346.4, dated Jul. 14, 2021.
Decision of Refusal for Japanese Application No. 2019-003425, dated Apr. 8, 2021.
Examination Report for Application No. GB1617019.3, dated Jun. 25, 2021.
Examination Report for Application No. GB1617021.9, dated May 14, 2021.
Examination Report for Application No. GB1617022.7, dated May 5, 2021.
Examination Report for Application No. GB1617023.5, dated May 20, 2021.
Examination Report for Application No. GB2015548.7, dated Jan. 8, 2021.
Notice of Reasons for Rejection for Japanese Application No. 2016-198938, dated Mar. 11, 2021.
Notice of Reasons for Rejection for Japanese Application No. 2016-198939, dated Mar. 11, 2021.
Notice of Reasons for Rejection for Japanese Application No. 2016-198940, dated Nov. 4, 2020.
Notice of Reasons for Rejection for Japanese Application No. 2016-198942, dated Mar. 30, 2021.
Notice of Reasons for Rejection for Japanese Application No. 2017-023700, dated Jan. 3, 2021.
Notice of Reasons for Rejection for Japanese Application No. 2019-003425, dated Jan. 19, 2021.
Notice of Reasons for Rejection for Japanese Application No. 2019-058143, dated Jan. 12, 2021.
Notice of Reasons for Rejection for Japanese Application No. 2019-129152, dated Mar. 2, 2021.
Notification of Reasons for Rejection for Japanese Application No. 2019-184272, dated May 25, 2021.
Notification of Reasons for Rejection for Japanese Application No. 2019-184275, dated May 18, 2021.
Notification of Reexamination for Chinese Application No. 201410098327.7, dated Dec. 16, 2020.
Notification of Second Office Action for Chinese Application 201610885758.7, dated May 7, 2021.
Search Report for Application No. GB1403617.2, dated Mar. 29, 2021.
Search Report for Application No. GB1617020.1, dated Jun. 1, 2021.
Search Report for Application No. GB1617022.7, dated May 5, 2021.
Search Report for Application No. GB2017949.5, dated Feb. 23, 2021.
Search Report for Application No. GB2019650.7, dated Apr. 21, 2021.
Combined Search and Examination Report for Application No. GB2112744.4, dated Oct. 4, 2021.

(56) References Cited

OTHER PUBLICATIONS

Notice of Reasons for Rejection for Japanese Application No. 2020-17387, dated Jul. 27, 2021.
Notification of the First Office Action for Chinese Application No. 201910079631.X, dated Jul. 9, 2021.

* cited by examiner

BIG DATA IN PROCESS CONTROL SYSTEMS

RELATED APPLICATIONS

This application is a continuation of U.S. patent application Ser. No. 13/784,041, filed Mar. 4, 2013, entitled "Big Data in Process Control Systems," the entire disclosure of which is hereby expressly incorporated by reference herein for all purposes.

TECHNICAL FIELD

The present disclosure relates generally to process plants and to process control systems, and more particularly, to the use of big data in process plants and in process control system.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

The architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

Additionally, to minimize controller memory usage in currently known process control systems, selected data that is to be archived or saved (as indicated by the configuration of the controller) is reported to the workstation or computing device for storage at an appropriate data historian or data silo. The current techniques used to report the data poorly utilizes communication resources and induces excessive controller loading. Additionally, due to the time delays in communication and sampling at the historian or silo, the data collection and time stamping is often out of sync with the actual process.

Similarly, in batch process control systems, to minimize controller memory usage, batch recipes and snapshots of controller configuration typically remain stored at a centralized administrative computing device or location (e.g., at a data silo or historian), and are only transferred to a controller when needed. Such a strategy introduces significant burst loads in the controller and in communications between the workstation or centralized administrative computing device and the controller.

Furthermore, the capability and performance limitations of relational databases of currently known process control systems, combined with the previous high cost of disk storage, play a large part in structuring data into independent entities or silos to meet the objectives of specific applications. For example, within the DeltaV™ system, the archiving of process models, continuous historical data, and batch and event data are saved in three different application databases or silos of data. Each silo has a different interface to access the data stored therein.

Structuring data in this manner creates a barrier in the way that historized data is accessed and used. For example, the root cause of variations in product quality may be associated with data in more than of these data silos. However, because of the different file structures of the silos, it is not possible to provide tools that allow this data to be quickly and easily accessed for analysis. Further, audit or synchronizing functions must be performed to ensure that data across different silos is consistent.

The limitations of currently known process plants and process control system discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models. Additionally, the obtained data may be inaccurate due to data compression, insufficient bandwidth, or shifted time stamps.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

A process control system big data network or system for a process control system or plant provides an infrastructure for supporting large scale data mining and data analytics of process data. In an embodiment, the process control big data network or system includes a plurality of nodes to collect and store all (or almost all) data that is generated, received, and/or observed by devices included in and associated with the process control system or plant. In particular, one of the nodes of the process control big data network may be a process control system big data apparatus. The process control system big data apparatus may include a unitary, logical data storage area configured to store, using a common format, multiple types of data that are generated by or related to the process control system, the process plant, and to one or more processes being controlled by the process plant. For example, the unitary, logical data storage area may store configuration data, continuous data, event data, plant data, data indicative of a user action, network management data, and data provided by or to systems external to the process control system or plant.

Unlike prior art process control systems, the identity of data that is to be collected at the nodes of the process control system big data network need not be defined or configured into the nodes a priori. Further, the rate at which data is collected at and transmitted from the nodes also need not be configured, selected, or defined a priori. Instead, the process control big data system may automatically collect all data that is generated at, received by or obtained by the nodes at the rate at which the data is generated, received or obtained, and may cause the collected data to be delivered in high fidelity (e.g., without using lossy data compression or any other techniques that may cause loss of original information) to the process control system big data apparatus to be stored (and, optionally, delivered to other nodes of the network).

The process control system big data system also may be able to provide sophisticated data and trending analyses for any portion of the stored data. For example, the process control big data system may be able to provide automatic data analysis across process data (that, in prior art process control systems, is contained in different database silos) without requiring any a priori configuration and without requiring any translation or conversion. Based on the analyses, the process control system big data system may be able to automatically provide in-depth knowledge discovery, and may suggest changes to or additional entities for the process control system. Additionally or alternatively, the process control system big data system may perform actions (e.g., prescriptive, predictive, or both) based on the knowledge discovery. The process control system big data system may also enable and assist users in performing manual knowledge discovery, and in planning, configuring, operating, maintaining, and optimizing the process plant and resources associated therewith.

Knowledge discovery and big data techniques within a process control plant or environment are inherently different than traditional big data techniques. Typically, traditional big data applications are singularly transactional, end-user directed, and do not have strict time requirements or dependencies. For example, a web retailer collects big data pertaining to browsed products, purchased products, and customer profiles, and uses this collected data to tailor advertising and up-sell suggestions for individual customers as they navigate the retailer's web site. If a particular retail transaction (e.g., a particular data point) is inadvertently omitted from the retailer's big data analysis, the effect of its omission is negligible, especially when the number of analyzed data points is very large. In the worst case, an advertisement or up-sell suggestion may not be as closely tailored to a particular customer as could have been if the omitted data point had been included in the retailer's big data analysis.

In process plant and process control environments, though, the dimension of time and the presence or omission of particular data points is critical. For example, if a particular data value is not delivered to a recipient component of the process plant within a certain time interval, a process may become uncontrolled, which may result in a fire, explosion, loss of equipment, and/or loss of human life. Furthermore, multiple and/or complex time-based relationships between different components, entities, and/or processes operating within the process plant and/or external to the process plant may affect operating efficiency, product quality, and/or plant safety. The knowledge discovery provided by the process control system big data techniques described herein may allow such time-based relationships to be discovered and utilized, thus enabling a more efficient and safe process plant that may produce a higher quality product.

For example, the techniques described herein may automatically discover that a combination of a particular input material characteristic, an ambient air pressure at a particular line, and a particular unplanned event may result in an X % degradation of product quality. The techniques may also automatically determine that the potential product quality degradation may be mitigated by adjusting a parameter of a different process that executes thirty minutes after the unplanned event, and may automatically take steps to adjust the parameter accordingly. Accordingly, the knowledge discovery and process control system big data techniques described herein may enable such relationships and actions to be discovered and acted upon within a process plant or process control environment, as is described in more detail below.

DETAILED DESCRIPTION

Figure 1:
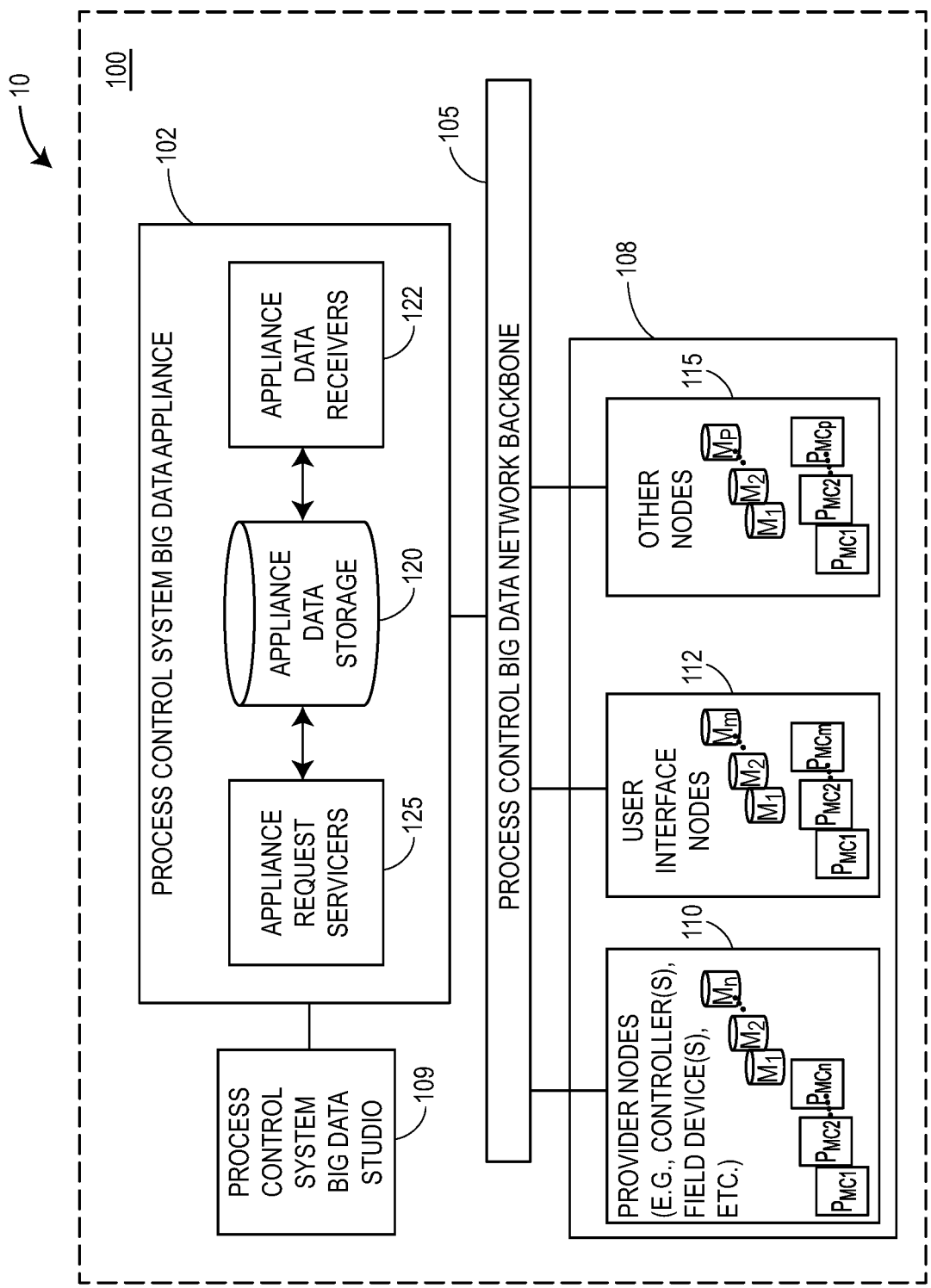
FIG. 1 is a block diagram of an example big data network for a process plant or process control system.

FIG. 1 is a block diagram of an example big data network 100 for a process plant or process control system 10. The example process control system big data network 100 includes a process control system big data apparatus or appliance 102, a process control system big data network backbone 105, and a plurality of nodes 108 that are communicatively connected to the backbone 105. Process-related data, plant-related data, and other types of data may be collected and cached at the plurality of nodes 108, and the data may be delivered, via the network backbone 105, to the process control system big data apparatus or appliance 102 for long-term storage (e.g., "historization") and processing. In an embodiment, at least some of the data may be delivered between nodes of the network 100, e.g., to control a process in real-time.

Any type of data related to the process control system 10 may be collected and stored at the process control system big data appliance 102. In an embodiment, process data may be collected and stored. For example, real-time process data such as continuous, batch, measurement and event data that is generated while a process is being controlled in the process plant 10 (and, in some cases, is indicative of an effect of a real-time execution of the process) may be collected and stored. Process definition, arrangement or set-up data such as configuration data and/or batch recipe data may be collected and stored. Data corresponding to the configuration, execution and results of process diagnostics may be collected and stored. Other types of process data may also be collected and stored.

In an embodiment, data highway traffic and network management data of the backbone 105 and of various other communication networks of the process plant 10 may be collected and stored. In an embodiment, user-related data such as data related to user traffic, login attempts, queries and instructions may be collected and stored. Text data (e.g., logs, operating procedures, manuals, etc.), spatial data (e.g., location-based data) and multi-media data (e.g., closed circuit TV, video clips, etc.) may be collected and stored.

In an embodiment, data that is related to the process plant 10 (e.g., to physical equipment included in the process plant 10 such as machines and devices) but that may not be generated by applications that directly configure, control, or diagnose a process may be collected and stored. For example, vibration data and steam trap data may be collected and stored. Plant safety data may be collected and stored. For example, data indicative of a value of a parameter corresponding to plant safety (e.g., corrosion data, gas detection data, etc.) may be stored, or data indicative of an event corresponding to plant safety may be stored. Data corresponding to the health of machines, plant equipment and/or devices may be collected and stored. For example, equipment data (e.g., pump health data determined based on vibration data and other data) may be collected. Data corresponding to the configuration, execution and results of equipment, machine, and/or device diagnostics may be collected and stored.

In some embodiments, data generated by or transmitted to entities external to the process plant 10 may be collected and stored, such as data related to costs of raw materials, expected arrival times of parts or equipment, weather data, and other external data. In an embodiment, all data that is generated, received, or observed by all nodes 108 that are communicatively connected to the network backbone 105 may be collected and caused to be stored at the process control system big data appliance 102.

In an embodiment, the process control system big data network 100 includes a process control system big data studio 109 configured to provide a primary interface into the process control system big data network 100 for configuration and data exploration, e.g., a user interface or an interface for use by other applications. The process control system big data studio 109 may be connected to the big data appliance 102 via the process control system big data network backbone 105, or may be directly connected to the process control system big data appliance 102.

Process Control Big Data Network Nodes

The plurality of nodes 108 of the process control big data network 100 may include several different groups of nodes 110-115. A first group of nodes 110, referred to herein as "provider nodes 110" or "provider devices 110," may include one or more nodes or devices that generate, route, and/or receive process control data to enable processes to be controlled in real-time in the process plant environment 10. Examples of provider devices or nodes 110 may include devices whose primary function is directed to generating and/or operating on process control data to control a process, e.g., wired and wireless field devices, controllers, or input/output (I/O devices). Other examples of provider devices 110 may include devices whose primary function is to provide access to or routes through one or more communication networks of the process control system (of which the process control big network 100 is one), e.g., access points, routers, interfaces to wired control busses, gateways to wireless communication networks, gateways to external networks or systems, and other such routing and networking devices. Still other examples of provider devices 110 may include devices whose primary function is to temporarily store process data and other related data that is accumulated throughout the process control system 10 and to cause the temporarily stored data to be transmitted for historization at the process control system big data appliance 102.

In an embodiment, at least one of the provider devices 110 is communicatively connected to the process control big data network backbone 105 in a direct manner. In an embodiment, at least one of the provider devices 110 is communicatively connected to the backbone 105 in an indirect manner. For example, a wireless field device may be communicatively connected to the backbone 105 via a router, and access point, and a wireless gateway. Typically, provider devices 110 do not have an integral user interface, although some of the provider devices 100 may have the capability to be in communicative connection with a user computing device or user interface, e.g., by communicating over a wired or wireless communication link, or by plugging a user interface device into a port of the provider device 110.

A second group of nodes 112, referred to herein as "user interface nodes 112" or user interface devices 112," may include one or more nodes or devices that each have an integral user interface via which a user or operator may interact with the process control system or process plant 10 to perform activities related to the process plant 10 (e.g., configure, view, monitor, test, analyze, diagnose, order, plan, schedule, annotate, and/or other activities). Examples of these user interface nodes or devices 112 may include mobile or stationary computing devices, workstations, handheld devices, tablets, surface computing devices, and any other computing device having a processor, a memory, and an integral user interface. Integrated user interfaces may include a screen, a keyboard, keypad, mouse, buttons, touch screen, touch pad, biometric interface, speakers and microphones, cameras, and/or any other user interface technology. Each user interface node 112 may include one or more integrated user interfaces. User interface nodes 112 may include a direct connection to the process control big data network backbone 105, or may include in indirect connection to the backbone 105, e.g., via an access point or a gateway. User interface nodes 112 may communicatively connect to the process control system big data network backbone 105 in a wired manner and/or in a wireless manner. In some embodiments, a user interface node 112 may connect to the network backbone 105 in an ad-hoc manner.

Of course, the plurality of nodes 108 of the process control big data network 100 is not limited to only provider nodes 110 and user interface nodes 112. One or more other types of nodes 115 may also be included in the plurality of nodes 108. For example, a node of a system that is external to the process plant 10 (e.g., a lab system or a materials handling system) may be communicatively connected to the network backbone 105 of the system 100. A node or device 115 may be communicatively connected to the backbone 105 via a direct or an indirect connection. A node or device 115 may be communicatively connected to the backbone 105 via a wired or a wireless connection. In some embodiments, the group of other nodes 115 may be omitted from the process control system big data network 100.

In an embodiment, at least some of the nodes 108 of the process control system big data network 100 may include an integrated firewall. Further, any number of the nodes 108 (e.g., zero nodes, one node, or more than one node) may each include respective memory storage (denoted in FIG. 1 by the icons $M_X$) to store or cache tasks, measurements, events, and other data in real-time. In an embodiment, a memory storage $M_X$ may comprise high density memory storage technology, for example, solid state drive memory, semiconductor memory, optical memory, molecular memory, biological memory, or any other suitable high density memory technology. In some embodiments, the memory storage $M_X$ may also include flash memory. The memory storage $M_X$ (and, in some cases, the flash memory) may be configured to temporarily store or cache data that is generated by, received at, or otherwise observed by its respective node 108. The flash memory $M_X$ of at least some of the nodes 108 (e.g., a controller device) may also store snapshots of node configuration, batch recipes, and/or other data to minimize delay in using this information during normal operation or after a power outage or other event that causes the node to be off-line. In an embodiment of the process control system big data network 100, all of the nodes 110, 112 and any number of the nodes 115 may include high density memory storage $M_X$. It is understood that different types or technologies of high density memory storage $M_X$ may be utilized across the set of nodes 108, or across a subset of nodes included in the set of nodes 108.

In an embodiment, any number of the nodes 108 (for example, zero nodes, one node, or more than one node) may each include respective multi-core hardware (e.g., a multi-core processor or another type of parallel processor), as denoted in the FIG. 1 by the icons $P_{MCX}$. At least some of the nodes 108 may designate one of the cores of its respective processor $P_{MCX}$ for caching real-time data at the node and, in some embodiments, for causing the cached data to be transmitted for storage at the process control system big data appliance 102. Additionally or alternatively, at least some of the nodes 108 may designate more than one of the multiple cores of its respective multi-core processor $P_{MCX}$ for caching real-time data. In some embodiments, the one or more designated cores for caching real-time data (and, in some cases, for causing the cached data to be stored at big data appliance 102) may be exclusively designated as such (e.g., the one or more designated cores may perform no other processing except processing related to caching and transmitting big data). In an embodiment, at least some of the nodes 108 may designate one of its cores to perform operations to control a process in the process plant 10. In an embodiment, one or more cores may be designated exclusively for performing operations to control a process, and may not be used to cache and transmit big data. It is understood that different types or technologies of multi-core processors $P_{MCX}$ may be utilized across the set of nodes 108, or across a subset of nodes of the set of nodes 108. In an embodiment of the process control system big data network 100, all of the nodes 110, 112 and any number of the nodes 115 may include some type of multi-core processor $P_{MCX}$.

It is noted, though, that while FIG. 1 illustrates the nodes 108 as each including both a multi-core processor $P_{MCX}$ and a high density memory $M_X$, each of the nodes 108 is not required to include both a multi-core processor $P_{MCX}$ and a high density memory $M_X$. For example, some of the nodes 108 may include only a multi-core processor $P_{MCX}$ and not a high density memory $M_X$, some of the nodes 108 may include only a high density memory $M_X$ and not a multi-core processor $P_{MCX}$, some of the nodes 108 may include both a multi-core processor $P_{MCX}$ and a high density memory $M_X$, and/or some of the nodes 108 may include neither a multi-core processor $P_{MCX}$ nor a high density memory $M_X$.

Examples of real-time data that may be cached or collected by provider nodes or devices 110 may include measurement data, configuration data, batch data, event data, and/or continuous data. For instance, real-time data corresponding to configurations, batch recipes, setpoints, outputs, rates, control actions, diagnostics, alarms, events and/or changes thereto may be collected. Other examples of real-time data may include process models, statistics, status data, and network and plant management data.

Examples of real-time data that may be cached or collected by user interface nodes or devices 112 may include, for example, user logins, user queries, data captured by a user (e.g., by camera, audio, or video recording device), user commands, creation, modification or deletion of files, a physical or spatial location of a user interface node or device, results of a diagnostic or test performed by the user interface device 112, and other actions or activities initiated by or related to a user interacting with a user interface node 112.

Collected data may be dynamic or static data. Collected data may include, for example, database data, streaming data, and/or transactional data. Generally, any data that a node 108 generates, receives, or observes may be collected or cached with a corresponding time stamp or indication of a time of collection/caching. In a preferred embodiment, all data that a node 108 generates, receives, or observes is collected or cached in its memory storage (e.g., high density memory storage $M_X$) with a respective indication of a time of each datum's collection/caching (e.g., a time stamp).

In an embodiment, each of the nodes 110, 112 (and, optionally, at least one of the other nodes 115) may be configured to automatically collect or cache real-time data and to cause the collected/cached data to be delivered to the big data appliance 102 and/or to other nodes 108 without requiring lossy data compression, data sub-sampling, or configuring the node for data collection purposes. Unlike prior art process control systems, the identity of data that is collected at the nodes or devices 108 of the process control system big data network 100 need not be configured into the devices 108 a priori. Further, the rate at which data is collected at and delivered from the nodes 108 also need not be configured, selected or defined. Instead, the nodes 110, 112 (and, optionally, at least one of the other nodes 115) of the process control big data system 100 may automatically collect all data that is generated by, received at, or obtained by the node at the rate at which the data is generated, received or obtained, and may cause the collected data to be delivered in high fidelity (e.g., without using lossy data compression or any other techniques that may cause loss of original information) to the process control big data appliance 102 and, optionally, to other nodes 108 of the network 100.

Figure 2:
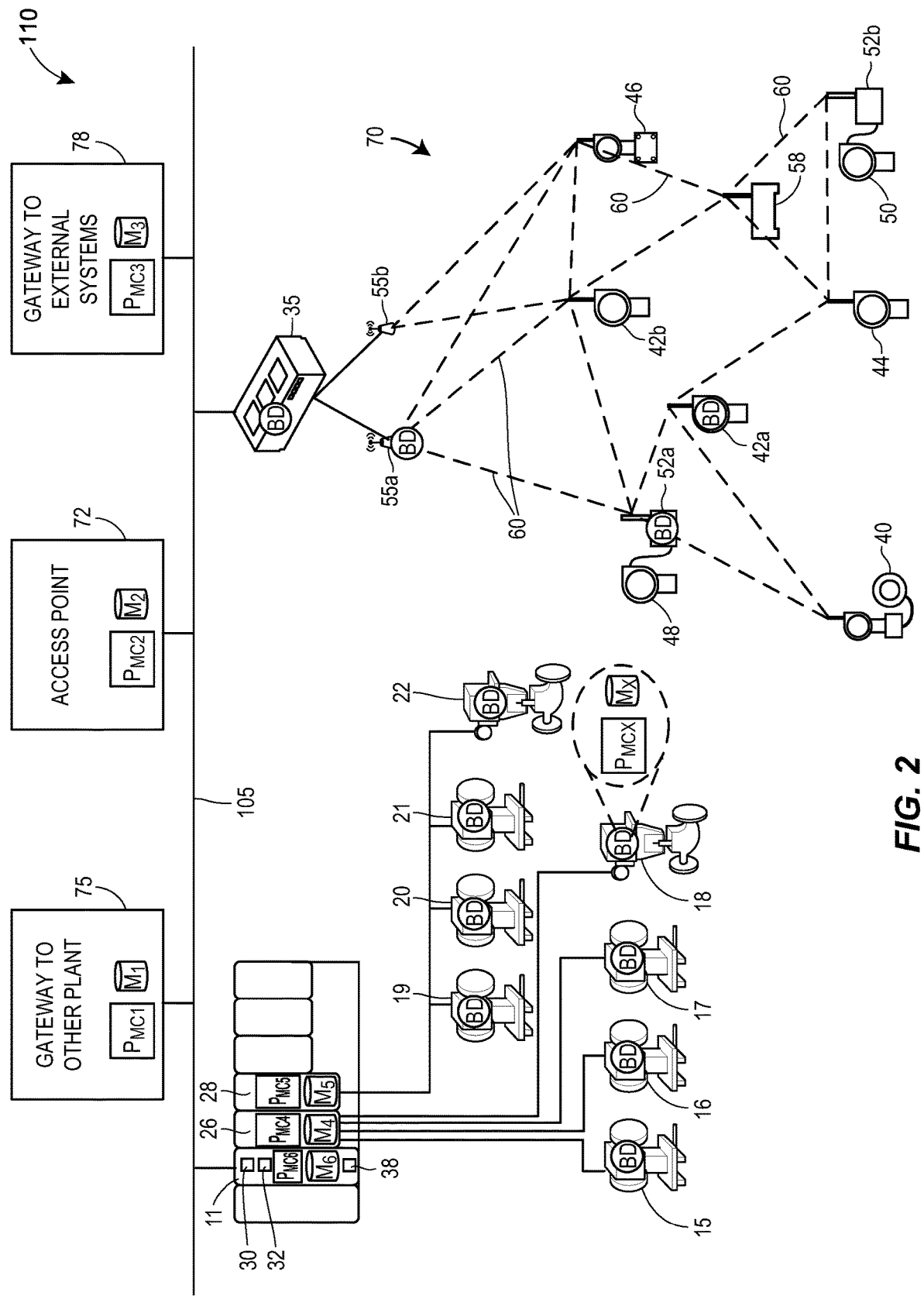
FIG. 2 is a block diagram illustrating an example arrangement of provider nodes included in the process control system big data network of FIG. 1.

A detailed block diagram illustrating example provider nodes 110 connected to process control big data network backbone 105 is shown in FIG. 2. As previously discussed, provider nodes 110 may include devices whose main function is to automatically generate and/or receive process control data that is used to perform functions to control a process in real-time in the process plant environment 10, such as process controllers, field devices and I/O devices. In a process plant environment 10, process controllers receive signals indicative of process measurements made by field devices, process this information to implement a control routine, and generate control signals that are sent over wired or wireless communication links to other field devices to control the operation of a process in the plant 10. Typically, at least one field device performs a physical function (e.g., opening or closing a valve, increase or decrease a temperature, etc.) to control the operation of a process, and some types of field devices may communicate with controllers using I/O devices. Process controllers, field devices, and I/O devices may be wired or wireless, and any number and combination of wired and wireless process controllers, field devices and I/O devices may be nodes 110 of the process control big data network 100.

FIG. 2 illustrates a controller 11 that is communicatively connected to wired field devices 15-22 via input/output (I/O) cards 26 and 28, and that is communicatively connected to wireless field devices 40-46 via a wireless gateway 35 and the network backbone 105. (In another embodiment, though, the controller 11 may be communicatively connected to the wireless gateway 35 using a communications network other than the backbone 105, such as by using another wired or a wireless communication link.) In FIG. 2, the controller 11 is shown as being a node 110 of the process control system big data network 100, and is directly connected to the process control big data network backbone 105.

The controller 11, which may be, by way of example, the DeltaV™ controller sold by Emerson Process Management, may operate to implement a batch process or a continuous process using at least some of the field devices 15-22 and 40-46. The controller 11 may be communicatively connected to the field devices 15-22 and 40-46 using any desired hardware and software associated with, for example, standard 4-20 ma devices, I/O cards 26, 28, and/or any smart communication protocol such as the FOUNDATION® Fieldbus protocol, the HART® protocol, the WirelessHART® protocol, etc. In an embodiment, the controller 11 may be additionally or alternatively communicatively connected with at least some of the field devices 15-22 and 40-46 using the big data network backbone 105. In the embodiment illustrated in FIG. 2, the controller 11, the field devices 15-22 and the I/O cards 26, 28 are wired devices, and the field devices 40-46 are wireless field devices. Of course, the wired field devices 15-22 and wireless field devices 40-46 could conform to any other desired standard(s) or protocols, such as any wired or wireless protocols, including any standards or protocols developed in the future.

The controller 11 of FIG. 2 includes a processor 30 that implements or oversees one or more process control routines (stored in a memory 32), which may include control loops. The processor 30 may communicate with the field devices 15-22 and 40-46 and with other nodes (e.g., nodes 110, 112, 115) that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices. The controller 11 may include one or more control routines 38 that may implement one or more control loops. Each control loop is typically referred to as a control module, and may be performed by executing one or more of the function blocks.

The wired field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 2, the field devices 15-18 are standard 4-20 ma devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. In some embodiments, though, at least some of the wired field devices 15-22 and/or at least some of the I/O cards 26, 28 may communicate with the controller 11 using the big data network backbone 105. In some embodiments, at least some of the wired field devices 15-22 and/or at least some of the I/O cards 26, 28 may be nodes of the process control system big data network 100.

In the embodiment shown in FIG. 2, the wireless field devices 40-46 communicate in a wireless network 70 using a wireless protocol, such as the WirelessHART protocol. Such wireless field devices 40-46 may directly communicate with one or more other nodes 108 of the process control big data network 100 that are also configured to communicate wirelessly (using the wireless protocol, for example). To communicate with one or more other nodes 108 that are not configured to communicate wirelessly, the wireless field devices 40-46 may utilize a wireless gateway 35 connected to the backbone 105 or to another process control communication network. In some embodiments, at least some of the wireless field devices 40-46 may be nodes of the process control system big data network 100.

The wireless gateway 35 is an example of a provider device 110 that may provide access to various wireless devices 40-58 of a wireless communication network 70. In particular, the wireless gateway 35 provides communicative coupling between the wireless devices 40-58, the wired devices 11-28, and/or other nodes 108 of the process control big data network 100 (including the controller 11 of FIG. 2). For example, the wireless gateway 35 may provide communicative coupling by using the big data network backbone 105 and/or by using one or more other communications networks of the process plant 10.

The wireless gateway 35 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 35 may translate commands between wired and wireless protocols that do not share any protocol layers. In addition to protocol and command conversion, the wireless gateway 35 may provide synchronized clocking used by time slots and superframes (sets of communication time slots spaced equally in time) of a scheduling scheme associated with the wireless protocol implemented in the wireless network 70. Furthermore, the wireless gateway 35 may provide network management and administrative functions for the wireless network 70, such as resource management, performance adjustments, network fault mitigation, monitoring traffic, security, and the like. The wireless gateway 35 may be a node 110 of the process control system big data network 100.

Similar to the wired field devices 15-22, the wireless field devices 40-46 of the wireless network 70 may perform physical control functions within the process plant 10, e.g., opening or closing valves or take measurements of process parameters. The wireless field devices 40-46, however, are configured to communicate using the wireless protocol of the network 70. As such, the wireless field devices 40-46, the wireless gateway 35, and other wireless nodes 52-58 of the wireless network 70 are producers and consumers of wireless communication packets.

In some scenarios, the wireless network 70 may include non-wireless devices. For example, a field device 48 of FIG. 2 may be a legacy 4-20 mA device and a field device 50 may be a traditional wired HART device. To communicate within the network 70, the field devices 48 and 50 may be connected to the wireless communication network 70 via a wireless adaptor (WA) 52a or 52b. Additionally, the wireless adaptors 52a, 52b may support other communication protocols such as Foundation® Fieldbus, PROFIBUS, DeviceNet, etc. Furthermore, the wireless network 70 may include one or more network access points 55a, 55b, which may be separate physical devices in wired communication with the wireless gateway 35 or may be provided with the wireless gateway 35 as an integral device. The wireless network 70 may also include one or more routers 58 to forward packets from one wireless device to another wireless device within the wireless communication network 70. The wireless devices 32-46 and 52-58 may communicate with each other and with the wireless gateway 35 over wireless links 60 of the wireless communication network 70.

Accordingly, FIG. 2 includes several examples of provider devices 110 which primarily serve to provide network routing functionality and administration to various networks of the process control system. For example, the wireless gateway 35, the access points 55*a*, 55*b*, and the router 58 include functionality to route wireless packets in the wireless communication network 70. The wireless gateway 35 performs traffic management and administrative functions for the wireless network 70, as well as routes traffic to and from wired networks that are in communicative connection with the wireless network 70. The wireless network 70 may utilize a wireless process control protocol that specifically supports process control messages and functions, such as WirelessHART.

The provider nodes 110 of the process control big data network 100, though, may also include other nodes that communicate using other wireless protocols. For example, the provider nodes 110 may include one or more wireless access points 72 that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 72 allow handheld or other portable computing devices (e.g., user interface devices 112) to communicative over a respective wireless network that is different from the wireless network 70 and that supports a different wireless protocol than the wireless network 70. In some scenarios, in addition to portable computing devices, one or more process control devices (e.g., controller 11, field devices 15-22, or wireless devices 35, 40-58) may also communicate using the wireless supported by the access points 72.

Additionally or alternatively, the provider nodes 110 may include one or more gateways 75, 78 to systems that are external to the immediate process control system 10. Typically, such systems are customers or suppliers of information generated or operated on by the process control system 10. For example, a plant gateway node 75 may communicatively connect the immediate process plant 10 (having its own respective process control big data network backbone 105) with another process plant having its own respective process control big data network backbone. In an embodiment, a single process control big data network backbone 105 may service multiple process plants or process control environments.

In another example, a plant gateway node 75 may communicatively connect the immediate process plant 10 to a legacy or prior art process plant that does not include a process control big data network 100 or backbone 105. In this example, the plant gateway node 75 may convert or translate messages between a protocol utilized by the process control big data backbone 105 of the plant 10 and a different protocol utilized by the legacy system (e.g., Ethernet, Profibus, Fieldbus, DeviceNet, etc.).

The provider nodes 110 may include one or more external system gateway nodes 78 to communicatively connect the process control big data network 100 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 2 only illustrates a single controller 11 with a finite number of field devices 15-22 and 40-46, this is only an illustrative and non-limiting embodiment. Any number of controllers 11 may be included in the provider nodes 110 of the process control big data network 100, and any of the controllers 11 may communicate with any number of wired or wireless field devices 15-22, 40-46 to control a process in the plan 10. Furthermore, the process plant 10 may also include any number of wireless gateways 35, routers 58, access points 55, wireless process control communication networks 70, access points 72, and/or gateways 75, 78.

As previously discussed, one or more of the provider nodes 110 may include a respective multi-core processor $P_{MCX}$, a respective high density memory storage $M_X$, or both a respective multi-core processor $P_{MCX}$ and a respective high density memory storage $M_X$ (denoted in FIG. 2 by the icon BD). Each provider node 100 may utilize its memory storage $M_X$ (and, in some embodiments, its flash memory) to collect and cache data. Each of the nodes 110 may cause its cached data to be transmitted to the process control system big data appliance 102. For example, a node 110 may cause at least a portion of the data in its cache to be periodically transmitted to the big data appliance 102. Alternatively or additionally, the node 110 may cause at least a portion of the data in its cached to be streamed to the big data appliance 102. In an embodiment, the process control system big data appliance 102 may be a subscriber to a streaming service that delivers the cached or collected data from the node 110. In an embodiment, the provider node 110 may host the streaming service.

For nodes 110 that have a direct connection with the backbone 105 (e.g., the controller 11, the plant gateway 75, the wireless gateway 35), the respective cached or collected data may be transmitted directly from the node 110 to the process control big data appliance 102 via the backbone 105, in an embodiment. For at least some of the nodes 110, though, the collection and/or caching may be leveled or layered, so that cached or collected data at a node that is further downstream (e.g., is further away) from the process control big data appliance 102 is intermediately cached at a node that is further upstream (e.g., is closer to the big data appliance 102).

To illustrate layered or leveled data caching, an example scenario is provided. in this example scenario, referring to FIG. 2, a field device 22 caches process control data that it generates or receives, and causes the contents of its cache to be delivered to an "upstream" device included in the communication path between the field device 22 and the process control big data appliance 102, such as the I/O device 28 or the controller 11. For example, the field device 22 may stream the contents of its cache to the I/O device 28, or the field device 22 may periodically transmit the contents of its cache to the I/O device 28. The I/O device 28 caches the information received from the field device 22 in its memory $M_5$ (and, in some embodiments, may also cache data received from other downstream field devices 19-21 in its memory $M_5$) along with other data that the I/O device 28 directly generates, receives and observes. The data that is collected and cached at the I/O device 28 (including the contents of the cache of the field device 22) may then be periodically transmitted and/or streamed to the upstream controller 11. Similarly, at the level of the controller 11, the controller 11 caches information received from downstream devices (e.g., the I/O cards 26, 28, and/or any of the field devices 15-22) in its memory $M_6$, and aggregates, in its memory $M_6$, the downstream data with data that the controller 11 itself directly generates, receives and observes. The controller 11 may then periodically deliver and/or stream the aggregated collected or cached data to the process control big data appliance 102.

In second example scenario of layered or leveled caching, the controller 11 controls a process using wired field devices (e.g., one or more of the devices 15-22) and at least one wireless field device (e.g., wireless field device 44). In a first embodiment of this second example scenario, the cached or collected data at the wireless device 44 is delivered and/or streamed directly to the controller 11 from the wireless device 44 (e.g., via the big data network 105), and is stored at the controller cache $M_6$ along with data from other devices or nodes that are downstream from the controller 11. The controller 11 may periodically deliver or stream the data stored in its cache $M_6$ to the process control big data appliance 102.

In another embodiment of this second example scenario, the cached or collected data at the wireless device 44 may be ultimately delivered to the process control big data appliance 102 via an alternate leveled or layered path, e.g., via the device 42a, the router 52a, the access point 55a, and the wireless gateway 35. In this embodiment, at least some of the nodes 41a, 52a, 55a or 35 of the alternate path may cache data from downstream nodes and may periodically deliver or stream its cached data to a node that is further upstream.

Accordingly, different types of data may be cached at different nodes of the process control system big data network 100 using different layering or leveling arrangements. In an embodiment, data corresponding to controlling a process may be cached and delivered in a layered manner using provider devices 110 whose primary functionality is control (e.g., field devices, I/O cards, controllers), whereas data corresponding to network traffic measurement may be cached and delivered in a layered manner using provider devices 110 whose primary functionality is traffic management (e.g., routers, access points, and gateways). In an embodiment, data may be delivered via provider nodes or devices 110 whose primary function (and, in some scenarios, sole function) is to collect and cache data from downstream devices (referred to herein as "historian nodes"). For example, a leveled system of historian nodes or computing devices may be located throughout the network 100, and each node 110 may periodically deliver or stream cached data to a historian node of a similar level, e.g., using the backbone 105. Downstream historian nodes may deliver or stream cached data to upstream historian nodes, and ultimately the historian nodes that are immediately downstream of the process control big data appliance 102 may deliver or stream respective cached data for storage at the process control big data appliance 102.

In an embodiment, layered caching may be performed by nodes 110 that communicate with each other using the process control system big data network backbone 105. In an embodiment, at least some of the nodes 110 may communicate cached data to other nodes 110 at a different level using another communication network and/or other protocol, such as HART, WirelessHART, Fieldbus, DeviceNet, WiFi, Ethernet, or other protocol.

Of course, while leveled or layered caching has been discussed with respect to provider nodes 110, the concepts and techniques may apply equally to user interface nodes 112 and/or to other types of nodes 115 of the process control system big data network 100. In an embodiment, a subset of the nodes 108 may perform leveled or layered caching, while another subset of the nodes 108 may cause their cached/collected data to be directly delivered to the process control big data appliance 102 without being cached or temporarily stored at an intermediate node. In some embodiments, historian nodes may cache data from multiple different types of nodes, e.g., from a provider node 110 and from a user interface node 112.

Process Control System Big Data Network Backbone

Returning to FIG. 1, the process control system big data network backbone 105 may include a plurality of networked computing devices or switches that are configured to route packets to/from various nodes 108 of the process control system big data network 100 and to/from the process control big data appliance 102 (which is itself a node of the process control system big data network 100). The plurality of networked computing devices of the backbone 105 may be interconnected by any number of wireless and/or wired links. In an embodiment, the process control system big data network backbone 105 may include one or more firewall devices.

The big data network backbone 105 may support one or more suitable routing protocols, e.g., protocols included in the Internet Protocol (IP) suite (e.g., UPD (User Datagram Protocol), TCP (Transmission Control Protocol), Ethernet, etc.), or other suitable routing protocols. In an embodiment, at least some of the nodes 108 utilize a streaming protocol such as the Stream Control Transmission Protocol (SCTP) to stream cached data from the nodes to the process control big data appliance 102 via the network backbone 105. Typically, each node 108 included in the process data big data network 100 may support at least an application layer (and, for some nodes, additional layers) of the routing protocol(s) supported by the backbone 105. In an embodiment, each node 108 is uniquely identified within the process control system big data network 100, e.g., by a unique network address.

In an embodiment, at least a portion of the process control system big data network 100 may be an ad-hoc network. As such, at least some of the nodes 108 may connect to the network backbone 105 (or to another node of the network 100) in an ad-hoc manner. In an embodiment, each node that requests to join the network 100 must be authenticated. Authentication is discussed in more detail in later sections.

Process Control System Big Data Appliance

Continuing with FIG. 1, in the example process control system big data process control network 100, the process control big data apparatus or appliance 102 is centralized within the network 100, and is configured to receive data (e.g., via streaming and/or via some other protocol) from the nodes 108 of the network 100 and to store the received data. As such, the process control big data apparatus or appliance 102 may include a data storage area 120 for historizing or storing the data that is received from the nodes 108, a plurality of appliance data receivers 122, and a plurality of appliance request servicers 125. Each of these components 120, 122, 125 of the process control big data appliance 102 is described in more detail below.

The process control system big data storage area 120 may comprise multiple physical data drives or storage entities, such as RAID (Redundant Array of Independent Disks) storage, cloud storage, or any other suitable data storage technology that is suitable for data bank or data center storage. However, to the nodes 108 of the network 100, the data storage area 120 has the appearance of a single or unitary logical data storage area or entity. As such, the data storage 120 may be viewed as a centralized big data storage area 120 for the process control big data network 100 or for the process plant 10. In some embodiments, a single logical centralized data storage area 120 may service multiple process plants (e.g., the process plant 10 and another process plant). For example, a centralized data storage area 120 may service several refineries of an energy company. In an embodiment, the centralized data storage area 120 may be directly connected to the backbone 105. In some embodiments, the centralized data storage area 120 may be connected to the backbone 105 via at least one high-bandwidth communication link. In an embodiment, the centralized data storage area 120 may include an integral firewall.

The structure of the unitary, logical data storage area 120 supports the storage of all process control system related data, in an embodiment. For example, each entry, data point, or observation of the data storage entity may include an indication of the identity of the data (e.g., source, device, tag, location, etc.), content of the data (e.g., measurement, value, etc.), and a time stamp indicating a time at which the data was collected, generated, received or observed. As such, these entries, data points, or observations are referred to herein as "time-series data." The data may be stored in the data storage area 120 using a common format including a schema that supports scalable storage, streamed data, and low-latency queries, for example.

In an embodiment, the schema may include storing multiple observations in each row, and using a row-key with a custom hash to filter the data in the row. The hash is based on the time stamp and a tag, in an embodiment. For example, the hash may be a rounded value of the time stamp, and the tag may correspond to an event or an entity of or related to the process control system. In an embodiment, metadata corresponding to each row or to a group of rows may also be stored in the data storage area 120, either integrally with the time-series data or separately from the time-series data. For example, the metadata may be stored in a schema-less manner separately from the time-series data.

In an embodiment, the schema used for storing data at the appliance data storage 120 is also utilized for storing data in the cache $M_X$ of at least one of the nodes 108. Accordingly, in this embodiment, the schema is maintained when data is transmitted from the local storage areas $M_X$ of the nodes 108 across the backbone 105 to the process control system big data appliance data storage 120.

In addition to the data storage 120, the process control system big data appliance 102 may further include one or more appliance data receivers 122, each of which is configured to receive data packets from the backbone 105, process the data packets to retrieve the substantive data and timestamp carried therein, and store the substantive data and timestamp in the data storage area 120. The appliance data receivers 122 may reside on a plurality of computing devices or switches, for example. In an embodiment, multiple appliance data receivers 122 (and/or multiple instances of at least one data receiver 122) may operate in parallel on multiple data packets.

In embodiments in which the received data packets include the schema utilized by the process control big data appliance data storage area 120, the appliance data receivers 122 merely populate additional entries or observations of the data storage area 120 with the schematic information (and, may optionally store corresponding metadata, if desired). In embodiments in which the received data packets do not include the schema utilized by the process control big data appliance data storage area 120, the appliance data receivers 122 may decode the packets and populate time-series data observations or data points of the process control big data appliance data storage area 120 (and, optionally corresponding metadata) accordingly.

Additionally, the process control system big data appliance 102 may include one or more appliance request servicers 125, each of which is configured to access time-series data and/or metadata stored in the process control system big data appliance storage 120, e.g., per the request of a requesting entity or application. The appliance request servicers 125 may reside on a plurality of computing devices or switches, for example. In an embodiment, at least some of the appliance request servicers 125 and the appliance data receivers 122 reside on the same computing device or devices (e.g., on an integral device), or are included in an integral application.

In an embodiment, multiple appliance request servicers 125 (and/or multiple instances of at least one appliance request servicer 125) may operate in parallel on multiple requests from multiple requesting entities or applications. In an embodiment, a single appliance request servicer 125 may service multiple requests, such as multiple requests from a single entity or application, or multiple requests from different instances of an application.

Figure 3:
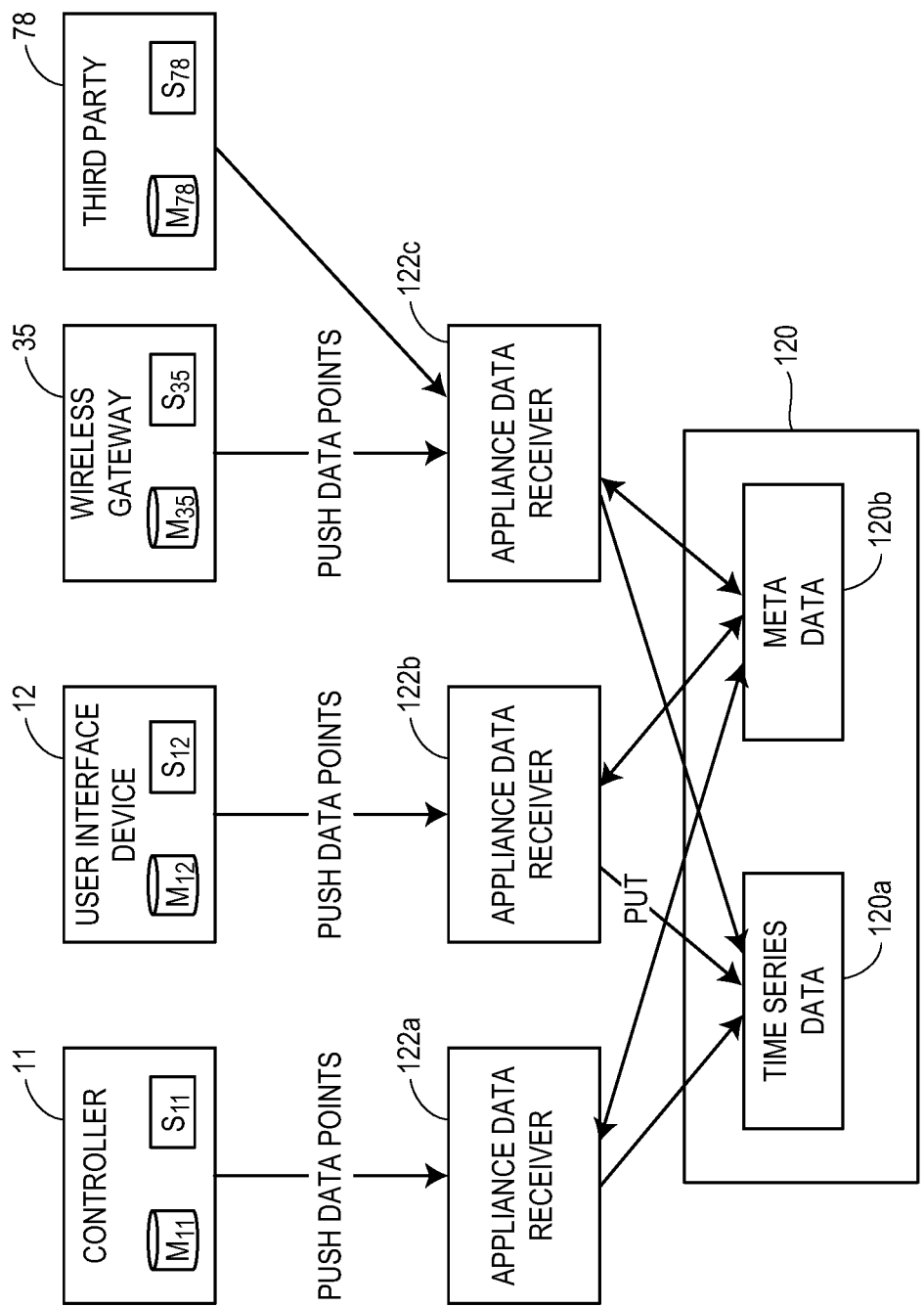
FIG. 3 is a block diagram illustrating an example use of appliance data receivers to store or historize data at the process control system big data appliance of FIG. 1.
Figure 4:
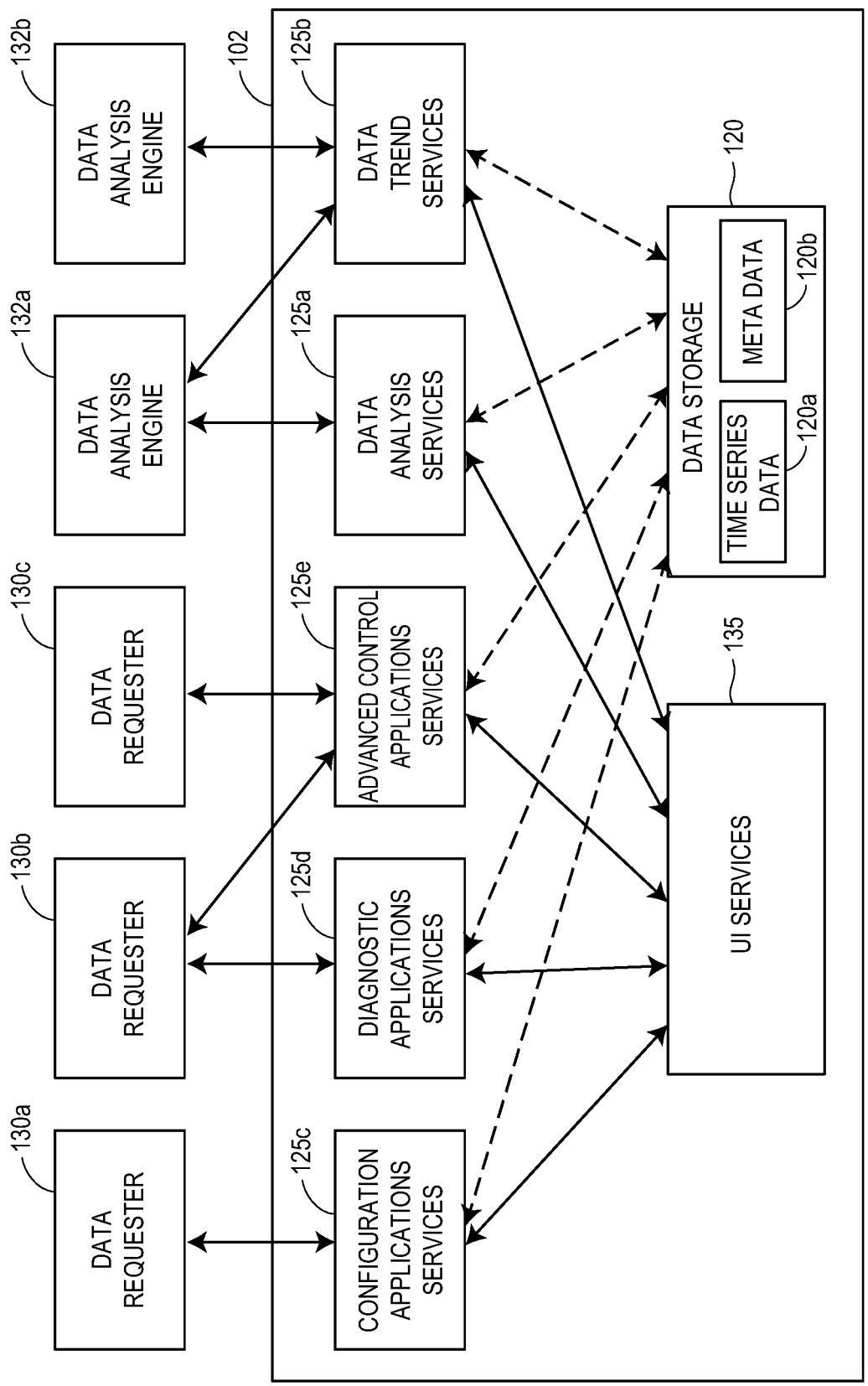
FIG. 4 is a block diagram illustrating an example use of appliance request servicers to access historized data stored at the process control system big data appliance of FIG. 1.

FIGS. 3 and 4 are example block diagrams that illustrate more detailed concepts and techniques which may be achieved using the appliance data receivers 122 and the appliance request servicers 125 of the process control system big data appliance 102.

FIG. 3 is an example block diagram illustrating the use of the appliance data receivers 122 to transfer data (e.g., streamed data) from the nodes 108 of the process control big data network 100 to the big data appliance 102 for storage and historization. FIG. 3 illustrates four example nodes 108 of FIG. 1, i.e., the controller 11, a user interface device 12, the wireless gateway 35, and a gateway to a third party machine or network 78. However, the techniques and concepts discussed with respect to FIG. 3 may be applied to any type and any number of the nodes 108. Additionally, although FIG. 3 illustrates only three appliance data receivers 122a, 122b and 122c, the techniques and concepts corresponding to FIG. 3 may be applied to any type and any number of appliance data receivers 122.

In the embodiment illustrated in FIG. 3, each of the nodes 11, 12, 35 and 78 includes a respective scanner $S_{11}$, $S_{12}$, $S_{35}$, $S_{78}$ to capture data that is generated, received or otherwise observed by the node 11, 12, 35 and 78. In an embodiment, the functionality of each scanner $S_{11}$, $S_{12}$, $S_{35}$, $S_{78}$ may be executed by a respective processor $P_{MCX}$ of the respective node 11, 12, 35, 78. The scanner $S_{11}$, $S_{12}$, $S_{35}$, $S_{78}$ may cause the captured data and a corresponding time stamp to be temporarily stored or cached in a respective local memory $M_{11}$, $M_{12}$, $M_{35}$, $M_{78}$, for example, in a manner such as previously described. As such, the captured data includes time-series data or real-time data. In an embodiment, the captured data is stored or cached in each of the memories $M_{11}$, $M_{12}$, $M_{35}$ and $M_{78}$ using the schema utilized by the process control big data storage area 120.

Each node 11, 12, 35 and 78 may transmit at least some of the cached data to one or more appliance data receivers 122a-122c, e.g., by using the network backbone 105. For example, at least one node 11, 12, 35, 78 may push at least some of the data from its respective memory $M_X$ when the cache is filled to a particular threshold. The threshold of the cache may be adjustable, in an embodiment. In an embodiment, at least one node 11, 12, 35, 78 may push at least some of data from its respective memory $M_X$ when a resource (e.g., a bandwidth of the network 105, the processor $P_{MCX}$, or some other resource) is sufficiently available. An availability threshold of a particular resource may be adjustable, in an embodiment.

In some embodiments, at least one node 11, 12, 35, 78 may push at least some of the data stored in the memories $M_X$ at periodic intervals. The periodicity of a particular time interval at which data is pushed may be based on a type of the data, the type of pushing node, the location of the pushing node, and/or other criteria. In an embodiment, the periodicity of a particular time interval may be adjustable. In some embodiments, at least one node 11, 12, 35, 78 may provide data in response to a request (e.g., from the process control big data appliance 102).

In some embodiments, at least one node 11, 12, 35, 78 may stream at least some of the data in real-time as the data is generated, received or otherwise observed by each node 11, 12, 35, 78 (e.g., the node may not temporarily store or cache the data, or may store the data for only as long as it takes the node to process the data for streaming). For example, at least some of the data may be streamed to the one or more appliance data receivers 122 by using a streaming protocol. In an embodiment, a node 11, 12, 35, 78 may host a streaming service, and at least one of the data receivers 122 and/or the data storage area 120 may subscribe to the streaming service.

Accordingly, transmitted data may be received by one or more appliance data receivers 122a-122c, e.g., via the network backbone 105. In an embodiment, a particular appliance data receiver 122 may be designated to receive data from one or more particular nodes. In an embodiment, a particular appliance data receiver 122 may be designated to receive data from only one or more particular types of devices (e.g., controllers, routers, or user interface devices). In some embodiments, a particular appliance data receiver 122 may be designated to receive only one or more particular types of data (e.g., network management data only or security-related data only).

The appliance data receivers 122a-122c may cause the data to be stored or historized in the big data appliance storage area 120. For example, the data received by each of the appliance data receivers 122a-122c may be stored in the data storage area 120 using the process control big data schema. In the embodiment shown in FIG. 3, the time series data 120a is illustrated as being stored separately from corresponding metadata 120b, although in some embodiments, at least some of the metadata 120b may be integrally stored with the time series data 120a.

In an embodiment, data that is received via the plurality of appliance data receivers 122a-122c is integrated so that data from multiple sources may be combined (e.g., into a same group of rows of the data storage area 120). In an embodiment, data that is received via the plurality of appliance data receivers 122a-122c is cleaned to remove noise and inconsistent data. An appliance data receiver 122 may perform data cleaning and/or data integration on at least some of the received data before the received data is stored, in an embodiment, and/or the process control system big data appliance 102 may clean some or all of the received data after the received data has been stored in the storage area 102, in an embodiment. In an embodiment, a device or node 110, 112, 115 may cause additional data related to the data contents to be transmitted, and the appliance data receiver 122 and/or the big data appliance storage area 120 may utilize this additional data to perform data cleaning. In an embodiment, at least some data may be cleaned (at least partially) by a node 110, 112, 115 prior to the node 110, 112, 115 causing the data to be transmitted to the big data appliance storage area 120 for storage.

Turning now to FIG. 4, FIG. 4 is an example block diagram illustrating the use of appliance request servicers 125 to access the historized data stored at the data storage area 120 of the big data appliance 102. FIG. 4 includes a set of appliance request servicers or services 125a-125e that are each configured to access time-series data 120a and/or metadata 120b per the request of a requesting entity or application, such as a data requester 130a-130c or a data analysis engine 132a-132b. While FIG. 4 illustrates five appliance request servicers 125a-125e, three data requesters 130a-130c, and two data analysis engines 132a, 132b, the techniques and concepts discussed herein with respect to FIG. 4 may be applied to any number and any types of appliance request servicers 125, data requesters 130, and/or data analysis engines 132.

In an embodiment, at least some of the appliance request servicers 125 may each provide a particular service or application that requires access to at least some of the data stored in the process control big data storage area 120. For example, the appliance request servicer 125a may be a data analysis support service, and the appliance request servicer 125b may be a data trend support service. Other examples of services 125 that may be provided by the process control system big data appliance 102 may include a configuration application service 125c, a diagnostic application service 125d, and an advanced control application service 125e. An advanced control application service 125e may include, for example, model predictive control, batch data analytics, continuous data analytics or other applications that require historized data for model building and other purposes. Other request servicers 125 may also be included in the process control system big data appliance 102 to support other services or applications, e.g., a communication service, an administration service, an equipment management service, a planning service, and other services.

A data requester 130 may be an application that requests access to data that is stored in the process control system big data appliance storage area 120. Based on a request of the data requester 130, the corresponding data may be retrieved from the process control big data storage area 120, and may be transformed and/or consolidated into data forms that are usable by the requester 130. In an embodiment, one or more appliance request servicers 125 may perform data retrieval and/or data transformation on at least some of the requested data.

At least some of the data requesters 130 and/or at least some of the request servicers 125 may be web services or web applications that are hosted by the process control system big data appliance 102 and that are accessible by nodes of the process control system big data network 100 (e.g., user interface devices 112 or provider devices 110). Accordingly, at least some of the devices or nodes 108 may include a respective web server to support a web browser, web client interface, or plug-in corresponding to a data requestor 130 or to a request servicer 125, in an embodiment. For example, a browser or application hosted at a user interface device 112 may source data or a web page stored at the big data appliance 102. For user interface devices 112 in particular, a data requester 130 or a request servicer 125 may pull displays and stored data through a User Interface (UI) service layer 135, in an embodiment.

A data analysis engine 132 may be an application that performs a computational analysis on at least some of the time-series data points stored in the appliance storage area 120 to generate knowledge. As such, a data analysis engine 132 may generate a new set of data points or observations. The new knowledge or new data points may provide a posteriori analysis of aspects of the process plant 10 (e.g., diagnostics or trouble shooting), and/or may provide a priori predictions (e.g., prognostics) corresponding to the process plant 10. In an embodiment, a data analysis engine 132 performs data mining on a selected subset of the stored data 120, and performs pattern evaluation on the mined data to generate the new knowledge or new set of data points or observations. In some embodiments, multiple data analysis engines 132 or instances thereof may cooperate to generate the new knowledge or new set of data points.

The new knowledge or set of data points may be stored in (e.g., added to) the appliance storage area 120, for example, and may additionally or alternatively be presented at one or more user interface devices 112. In some embodiments, the new knowledge may be incorporated into one or more control strategies operating in the process plant 10. A particular data analysis engine 132 may be executed when indicated by a user (e.g., via a user interface device 112), and/or the particular data analysis engine 132 may be executed automatically by the process control system big data appliance 102.

Generally, the data analysis engines 132 of the process control system big data appliance 102 may operate on the stored data to determine time-based relationships between various entities and providers within and external to the process plant 10, and may utilize the determined time-based relationship to control one or more processes of the plant 10 accordingly. As such, the process control system big data appliance 102 allows for one or more processes to be coordinated with other processes and/or to be adjusted over time in response to changing conditions and factors. In some embodiments, the coordination and/or adjustments may be automatically determined and executed under the direction of the process control system big data appliance 102 as conditions and events occur, thus greatly increasing efficiencies and optimizing productivity over known prior art control systems.

Examples of possible scenarios in which the knowledge discovery techniques of data analysis engines 132 abound. In one example scenario, a certain combination of events leads to poor product quality when the product is eventually generated at a later time (e.g., several hours after the occurrence of the combination of events). The operator is ignorant of the relationship between the occurrence of the events and the product quality. Rather than detecting and determining the poor product quality several hours hence and trouble-shooting to determine the root causes of the poor product quality (as is currently done in known process control systems), the process control system big data appliance 102 (and, in particular, one or more of the data analysis engines 132 therein) may automatically detect the combination of events at or shortly after their occurrence, e.g., when the data corresponding to the events' occurrences is transmitted to the appliance 102. The data analysis engines 132 may predict the poor product quality based on the occurrence of these events, may alert an operator to the prediction, and/or may automatically adjust or change one or more parameters or processes in real-time to mitigate the effects of the combination of events. For example, a data analysis engine 132 may determine a revised set point or revised parameter values and cause the revised values to be used by provider devices 110 of the process plant 10. In this manner, the process control system big data appliance 102 allows problems to be discovered and potentially mitigated much more quickly and efficiently as compared to currently known process control systems.

In another example scenario, at least some of the data analysis engines 132 may be utilized to detect changes in product operation. For instance, the data analysis engines 132 may detect changes in certain communication rates, and/or from changes or patterns of parameter values received from a sensor or from multiple sensors over time which may indicate that system dynamics may be changing. In yet another example scenario, the data analysis engines 132 may be utilized to diagnose and determine that a particular batch of valves or other supplier equipment are faulty based on the behavior of processes and the occurrences of alarms related to the particular batch across the plant 10 and across time.

In another example scenario, at least some of the data analysis engines 132 may predict product capabilities, such as vaccine potency. In yet another example scenario, the data analysis engines 132 may monitor and detect potential security issues associated with the process plant 10, such as increases in log-in patterns, retries, and their respective locations. In still another example scenario, the data analysis engines 132 may analyze data aggregated or stored across the process plant 10 and one or more other process plants. In this manner, the process control system big data appliance 102 allows a company that owns or operates multiple process plants to glean diagnostic and/or prognostic information on a region, an industry, or a company-wide basis.

Process Control System Big Data Studio

As previously mentioned with respect to FIG. 1, the process control system big data studio 109 may provide an interface into the example process control system big data network 100 for configuration and for data exploration. Accordingly, the process control big data studio 109 may be in communicative connection with one or more appliance data receivers 122 of the process control system big data appliance 102 and/or with one or more appliance request servicers 125 of the process control system big data appliance 102. In an embodiment, the process control big data studio 109 may reside on one or more computing devices, zero or more of which may be a computing device on which another component of the process control big data appliance 102 resides (e.g., an appliance request servicer 125, an appliance data receiver 122, or another component). Generally, the process control system big data studio 109 allows configuration and data exploration to be performed in an off-line environment, and any outputs generated by the studio 109 may be instantiated into a runtime environment of the process control plant 10. As used herein, the term "off-line" indicates that configuration and data exploration activities are partitioned from the operating plant 10 so that configuration and data exploration activities may be performed without affecting operations of the process plant 10 even when the plant 10 itself is operating or on-line.

Figure 5:
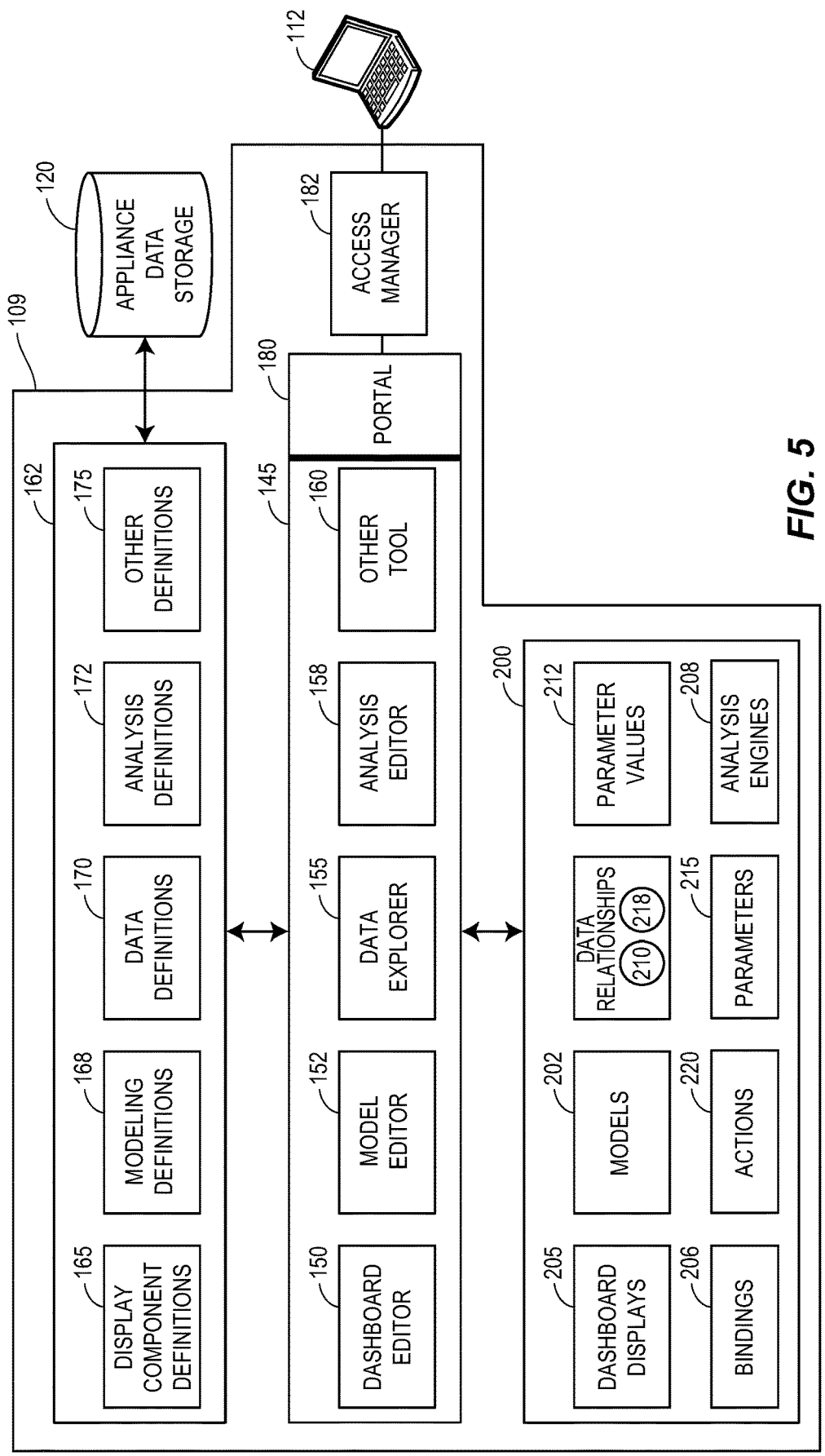
FIG. 5 is a block diagram of an example embodiment of the process control system big data studio of FIG. 1.

A block diagram of an embodiment of the process control system big data studio 109 is shown in FIG. 5, which is discussed with concurrent reference to FIGS. 1-4. The process control system big data studio 109 may provide one or more configuration or exploration applications or tools 145 to enable configuration and data exploration. For example, the applications or tools 145 may include a dashboard editor 150, a model editor 152, a data explorer 155, an analysis editor 158, and/or one or more other tools or applications 160. Descriptions of each of these tools 150-160 are provided in later sections.

Each of the tools 150-160 may operate on at least some of the stored time-series data 120 and/or on one or more definitions 162 that are available to the process control system big data studio 109. The definitions 162 may describe building components associated with the process control system 10 that may be combined by a tool 145 to generate more complex components, which may be later instantiated. In an embodiment, the definitions 162 are stored in the process control system big data storage area 120, or in some other storage location that is accessible to the big data studio 109.

The definitions 162 that are available to the tools 145 may include, for example, one or more display component definitions 165 that define or describe components that enable various display icons, text, graphics and views to be presented at a user interface. The display component definitions may include, for example, display element definitions, display view or visualization definitions, binding definitions, etc.

The definitions 162 may include one or more modeling definitions 168. Modeling definitions 168 may define or describe, for example, definitions of products (e.g., products being created by the process plant 10), definitions of equipment or devices (e.g., equipment or devices included in the process plant 10), definitions of parameters, calculations, function blocks, runtime modules, and other functionality used to control processes and to otherwise operate, manage or optimize the process plant 10, and/or other entity definitions. Modeling definitions, when instantiated, may be incorporated into a process control model or into other model that is related to the configuration, operation, and/or management of at least a portion of the process control plant 10 and/or processes controlled therein.

The definitions 162 may include one or more data definitions 170, in an embodiment. Data definitions 170 may define a type of data that may be input into or output a model, such as a process control model, a data analysis model, or any other model that is related to the configuration, operation, management, and/or or analysis of at least a portion of the process control plant 10 and/or processes controlled therein. Generally, the models into which the defined data is input or output may be created from one or more entities whose definition is included in the modeling definitions 168.

As such, data definitions 170 may define or describe various data types (structured and/or unstructured), contexts and/or boundary conditions of data that is communicated, generated, received and/or observed within the process plant 10. The data definitions 170 may pertain to database data, streamed data, transactional data, and/or any other type of data that is communicated via the process control system big data network 100 and is stored or historized in process control system big data storage 120. For example, the data stream definitions 170 may describe a particular data stream as comprising temperatures in degrees Celsius that are typically expected to be in the range of Temperature A to Temperature B. The data stream definitions 170 may describe another stream data as comprising the connection times and identities of devices at a particular wireless access point. The data stream definitions 170 may describe yet another stream of data as including alarm events at a particular type of controller. Accordingly, the data stream definitions 170 may also include definitions or descriptions of data relationships. For example, the data stream definitions 170 may include a relationship showing that alarm event data may be produced by a controller, a sensor, or a device; or the data stream definitions may include a relationship showing how a percentage of purity in an input material affects output quality of a particular line.

In an embodiment, the data definitions 170 may include definitions and descriptions of data types, contexts, and/or boundary conditions of data that is utilized by displays, analyses, and other applications related to the process plant 10. For example, the data definitions 170 may describe Boolean numbers, scientific notation, variable notation, text in different languages, encryption keys, and the like.

Additionally, the definitions 162 may include one or more analyses or algorithm definitions 172. Analysis definitions 172 may define or describe, for example, computational analyses that may be performed on a set of data, e.g., on a selected subset of the stored data 120. Examples of analyses definitions 172 may include data analyses, (e.g., averages, graphs, histograms, classification techniques, etc.), probabilistic and/or statistical functions (e.g., regression, partial least squares, conditional probabilities, etc.), time-based analysis (e.g., time series, Fourier analysis, etc.), visualizations (e.g., bar charts, scatter plots, pie charts, etc.), discovery algorithms, data mining algorithms, data trending, etc. In an embodiment, at least some of the analyses definitions 172 may be nested, and/or at least some of the analyses definitions 172 may be interdependent.

Of course, other definitions 175 in addition to or instead of the definitions 165-172 discussed above may be available for use by the tools 145 of the process control system big data studio 109. In an embodiment, at least some of the definitions 162 may be automatically created and stored by the process control system big data appliance 102. In an embodiment, at least some of the definitions 162 may be created and stored by a user at a user interface 112.

Accordingly, the example process control system big data studio 109 includes an interface or portal 180, a respective instance of which may be presented at each user interface device 112. For example, the process control big studio 109 may host a web service or web application corresponding to the portal 180 that may be accessed at a user interface device 112 via a web browser, plug-in, or web client interface. In another example, a user interface of the big data studio 109 may include a client application at a user interface device 112 that communicates with a host or server application at the process control big data studio 109 that corresponds to the portal 180. To a user, the process control system big data studio portal 180 may appear as a navigable display on the user interface device 112, in an embodiment.

In an embodiment, an access manager 182 of the data studio 109 may provide secure access to the data studio 109. A user, a user interface device 112, and/or an access application may be required to be authenticated by the access manager 182 in order to gain access to the big data studio 109. In an embodiment, the user may be required to provide a username and a password or other secure identifier (e.g., biometric identifier, etc.) to login to the data studio portal 180. Additionally or alternatively, the user, the user interface device 112 and/or the access application may be required to be authenticated, such as by using a Public Key Infrastructure (PKI) encryption algorithm or other algorithm. In an embodiment, a certificate of authentication of a PKI encryption algorithm that is utilized by the user interface device 112 may be generated based on at least one parameter such as a spatial or geographical location, a time of access, a context of access, an identity of the user and/or the user's employer, an identity of the process control plant 10, a manufacturer of the user device 112, or some other parameter. In an embodiment, a unique seed corresponding to the certificate and the shared key may be based on one or more of the parameters.

After authentication, the data studio portal 180 may allow the user, the user interface device 112, and/or the access application to access the tools or functions 145 of the process control big data studio 109. In an embodiment, an icon corresponding to each tool or function 150-160 may be displayed at the user interface device 112. Upon selection of a particular tool 150-160, a series of display views or screens may be presented to enable the user to utilize the selected tool.

The model editor 152 tool may enable a user to configure (e.g., create or modify) a model for controlling processes in the process control system 10. For example, a user may select and connect various modeling definitions 168 (and in some cases, data stream definitions 170) to generate or change models.

The analysis editor 182 may enable a user to configure (e.g., create or modify) a data analysis function (e.g., one of the data analysis engines 132) for analyzing data related to the process control system 10. For instance, a user may configure a complex data analysis function from one or more analysis definitions 172 (and in some cases, at least some of the data stream definitions 170).

A user may explore historized or stored data 120 using the data explorer 155. The data explorer 155 may enable a user to view or visualize at least portions of the stored data 120 based on the data stream definitions 170 (and in some cases, based on at least some of the analysis definitions 172). For example, the data explorer 155 may allow a user to pull temperature data of a particular vat from a particular time period, and to apply a trending analysis to view the changes in temperature during that time period. In another example, the data explorer 155 may allow a user to perform a regression analysis to determine independent or dependent variables affecting the vat temperature.

In an embodiment, the dashboard editor 150 may enable a user to configure dashboard displays or display views. The term "dashboards," as used herein, generally refers to user interface displays of the runtime environment of the process plant 10 that are displayed on various user interface devices 112. A dashboard may include a real-time view of an operation of a portion of a process being controlled in the plant 10, or may include a view of other data related to the operation of the process plant 10 (e.g., network traffic, technician locations, parts ordering, work order scheduling, etc.), for example. In some embodiments, a runtime dashboard may include a user control to access the data studio portal 180 to enable a user to perform configuration.

Of course, while the above describes a user accessing the tools 145, in some embodiments, a user interface device 112 and/or an access application may access any of the tools 145 in a similar manner.

Each of the tools 150-160 may generate respective outputs 200. Definitions corresponding to the generated outputs 200 may be stored or saved with the other definitions 162, e.g., either automatically, or in response to a user command. In an embodiment, the corresponding definitions of the outputs 200 of the tools 150-160 are stored in the process control big data storage area 102, for example, as a type of time-series data 102a and (optionally) corresponding metadata 102b.

At least some outputs 200 may be instantiated into the runtime environment of the process control system 10. For example, the model editor 152 may generate models 202 (e.g., process control models, network management models, diagnostic models, etc.) or changes to an existing model 202 that may be downloaded to one or more provider devices or nodes 110. Corresponding definitions of the generated models and/or model changes 202 may be stored in the modeling definitions 168, in an embodiment.

The dashboard editor 150 may generate one or more displays or display components 205, such as operational, configuration and/or diagnostic displays, data analysis displays, and/or graphics or text that may be presented at user interface devices 112. The dashboard editor 150 may additionally generate corresponding bindings 206 for the displays or display components 205 so that they 205 may be instantiated in a runtime environment. In an embodiment, corresponding definitions of the generated display/display components 205 and their respective bindings 206 may be stored in the display component definitions 165.

The analysis editor 158 may generate data analysis functions, computations, utilities or algorithms 208 (e.g., one or more of the data analyses 132 shown in FIG. 4) to be utilized by the process control system big data appliance 102. Corresponding analysis definitions of the generated analyses 208 may be stored in the analyses definitions 172, for example.

With particular regard to the data explorer tool 155, the data explorer 155 may provide access to historized data stored in the process control system big data storage area 102. The historized data may include time-series data points 120a that have been collected during runtime of the process control system 10 and have been stored (along with any corresponding metadata 120b) in the process control system big data storage area 120. For example, the historized data may include indications of models, parameters and parameter values, batch recipes, configurations, etc. that were used during the operation of the process plant 10, and the historized data may include indications of user actions that occurred during the operation of the process plant 10 or related activities.

Using the data explorer 155, various visualizations of at least portions of the stored data 120 may be performed, in an embodiment. For example, the data explorer 155 may utilize one or more data analysis definitions 172 to generate and present a data visualization at the data studio interface or portal 180. Upon viewing the visualization, a user 112 may discover a previously unknown data relationship 210. For example, a user 112 may discover a data relationship between a particular event, an ambient temperature, and a yield of a production line. As such, the discovered data relationship 210 may be an output 200 of the data explorer 155 and may be saved, e.g., as a data definition 170.

In an embodiment, the user 112 may instruct the process control system big data appliance 102 (e.g., via the analysis editor 158 at the data studio portal 180) to identify any models 168 that may be affected by the discovered relationship 210. For example, the user 112 may select, using the analysis editor 158, one or more data analysis engines 132 to operate on the discovered relationship 210 (and optionally, in conjunction with additional stored data 120). In response to the user instruction, the process control system big data appliance 102 may identify one or more models 168 that are affected by the discovered data relationship 210. In an embodiment, the process control system big data appliance 102 may also determine updated parameter values 212 and/or new parameters 215 for the affected models 168 based on the discovered data relationship 210, and may automatically update the affected models 168 accordingly. In an embodiment, the process control system big data appliance 102 may automatically create a new model 202 based on the discovered data relationship 210. The process control system big data appliance 102 may store the updated and/or new models 202, parameters 215, parameter values 215, etc. as corresponding definitions 162, in an embodiment. In an embodiment, any of the identified models 168, 202, parameters 215, parameter values 212, etc. may be presented to the user 112, e.g., via the portal 180, and instead of automatically implementing changes, the data appliance 102 may only do so if the user so instructs.

In some embodiments, rather than relying on user directed knowledge discovery, the process control system big data appliance 102 may automatically perform knowledge discovery by automatically analyzing historized data. For example, one or more data analysis engines 132 of the process control system big data appliance 102 may execute in the background to automatically analyze and/or explore one or more runtime streams of data. For example, the process control system big data appliance 102 may execute an instance of the data explorer 155 and/or the analysis editor 158 in the background. Based on the background exploration and analysis, the data analysis engines 132 may discover a previously unknown data relationship 218. The data analysis engines 132 may save the discovered data relationship 218, e.g., in the data definitions 170. In an embodiment, the process control system big data appliance 102 (e.g., the data studio 109, an appliance data receiver 122 or other component) may alert or notify a user of the discovered data relationship 218, e.g., via the portal 180.

In an embodiment, the process control system big data appliance 102 may automatically identify stored models, parameters, and/or parameter values 168 which may be affected by the automatically discovered data relationship 218, and may determine updated or new parameter values 212, updated or new models 202, and/or other actions to be taken 220 based on the discovered data relationship 218. The process control system big data appliance 102 may suggest the updated/new parameters 215, parameter values 212, models 202, and/or other actions 220 to a user 112 via the portal 180, in an embodiment. For example, the process control system big data appliance 102 may suggest new alarm limits, may suggest replacing a valve, or may suggest a predicted time at which a new area of the plant 10 is to be installed and operational to optimize output. In an embodiment, the process control system big data appliance 102 may automatically apply a new or updated model, parameter, parameter value, or action without informing the user 112.

In an embodiment, the process control big data appliance 102 may hypothesize candidate models, parameters, parameter values and/or actions to be modified or created, and may test its hypotheses off-line, e.g., against a larger subset of the historized data 120. In this embodiment, only validated models, parameters, parameter values, and/or actions may be suggested to the user, saved in the definitions 162, and/or automatically applied to the system 10.

Figure 6:
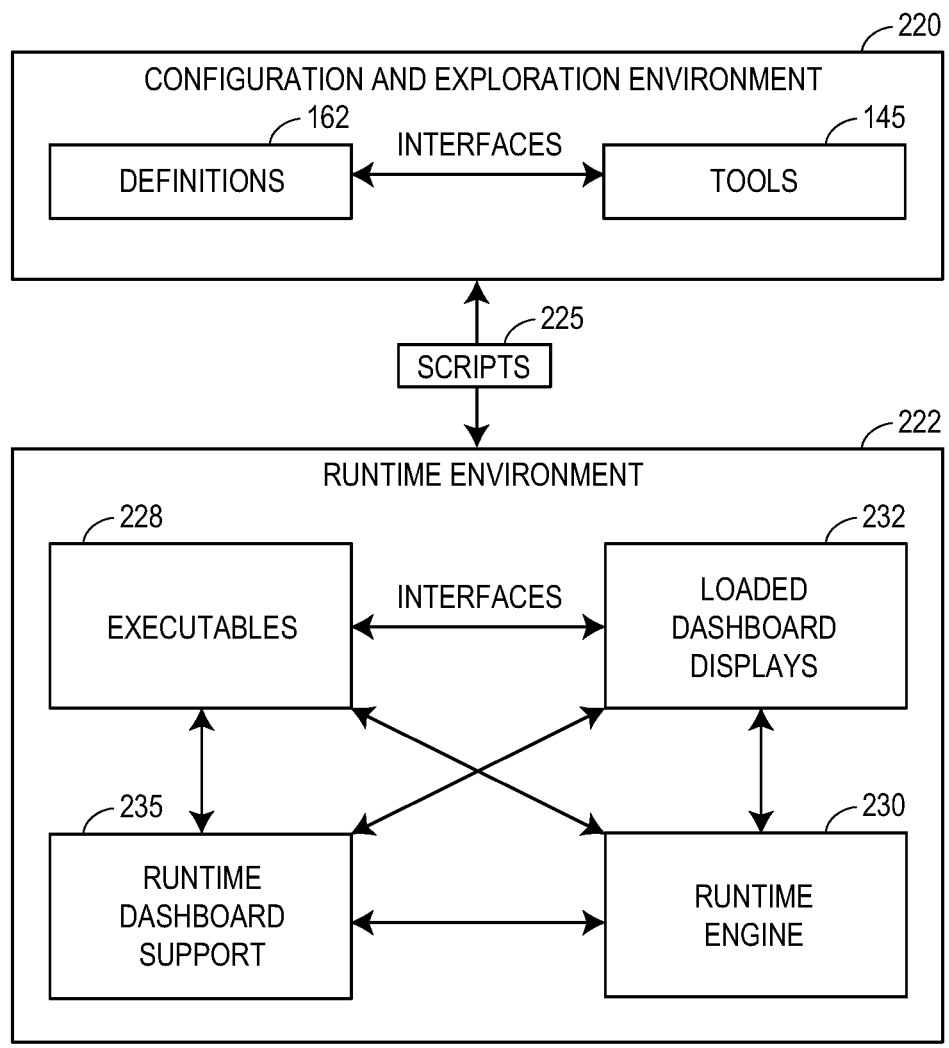
FIG. 6 is a block diagram of an example coupling between a configuration and exploration environment provided by the process control system big data studio of FIG. 1 and a runtime environment of the process plant or process control system.

Turning now to FIG. 6, FIG. 6 is a block diagram illustrating an embodiment of a coupling between the configuration and exploration environment (e.g., the off-line environment) 220 provided by the process control system big data studio 109, and a runtime environment 222 that is instantiated in the process plant or control system 10. The coupling is effected through one or more scripts 225, in an embodiment.

The scripts 225 may provide one or more capabilities to, for example, download executables 228 corresponding to the definitions 162 of models 168, data bindings and dashboard information 165, data relationships 170, and/or other aspects from the configuration and exploration environment 220 into the runtime environment 222 of one or more nodes 108. Accordingly, the scripts 225 may enable on-line access to one or more components 162 that were developed during an off-line phase (e.g., by using the tools 145 of the data studio 109). In an embodiment, the scripts 225 may additionally provide capabilities for a node 108 to upload information that is generated or created in the runtime environment 222 to the configuration and exploration environment 220. For example, new or modified models, parameters, analyses or other entities created at a user interface device 112 may be uploaded and stored as new or modified definitions 162.

In an embodiment, the scripts 225 may download executables 228 corresponding to selected definitions 162 to one or more nodes 108. A particular download script 225 may be performed in response to a user instruction, or may be automatically performed by the process control system big data appliance 102. In the runtime environment 222, a runtime engine 230 (e.g., as executed by a processor such as the processor $P_{MCX}$) may operate on the executables 228 to instantiate the entities corresponding to the selected definitions 162. In an embodiment, each node 108 may include a respective runtime engine 230 to operate on the downloaded executables 228.

With regard to executables 228 corresponding to dashboard displays in particular, a respective download script 225 may bind data definitions 170 and/or model definitions 168 to the dashboard definition 165 to generate a corresponding dashboard executable 228. In some embodiments, pre-processing may be required to be performed on a dashboard executable 228 before loading the corresponding dashboard display 232 and corresponding data and/or model descriptions in the runtime environment 222 at a user interface device 112. In an embodiment, a runtime dashboard support engine 235 may perform the pre-processing and/or the loading in the run-time environment 222. The runtime dashboard support engine 235 may be, for example, an application in communicative connection with the runtime engine 230. The runtime dashboard support engine 235 may be hosted, for example, at the process control big data appliance 102, at the user interface device 112, or at least partially at the process control big data appliance 102 and at least partially at the user interface device 112. In some embodiments, the runtime engine 230 includes at least a portion of the runtime dashboard support engine 235.

Figure 7:
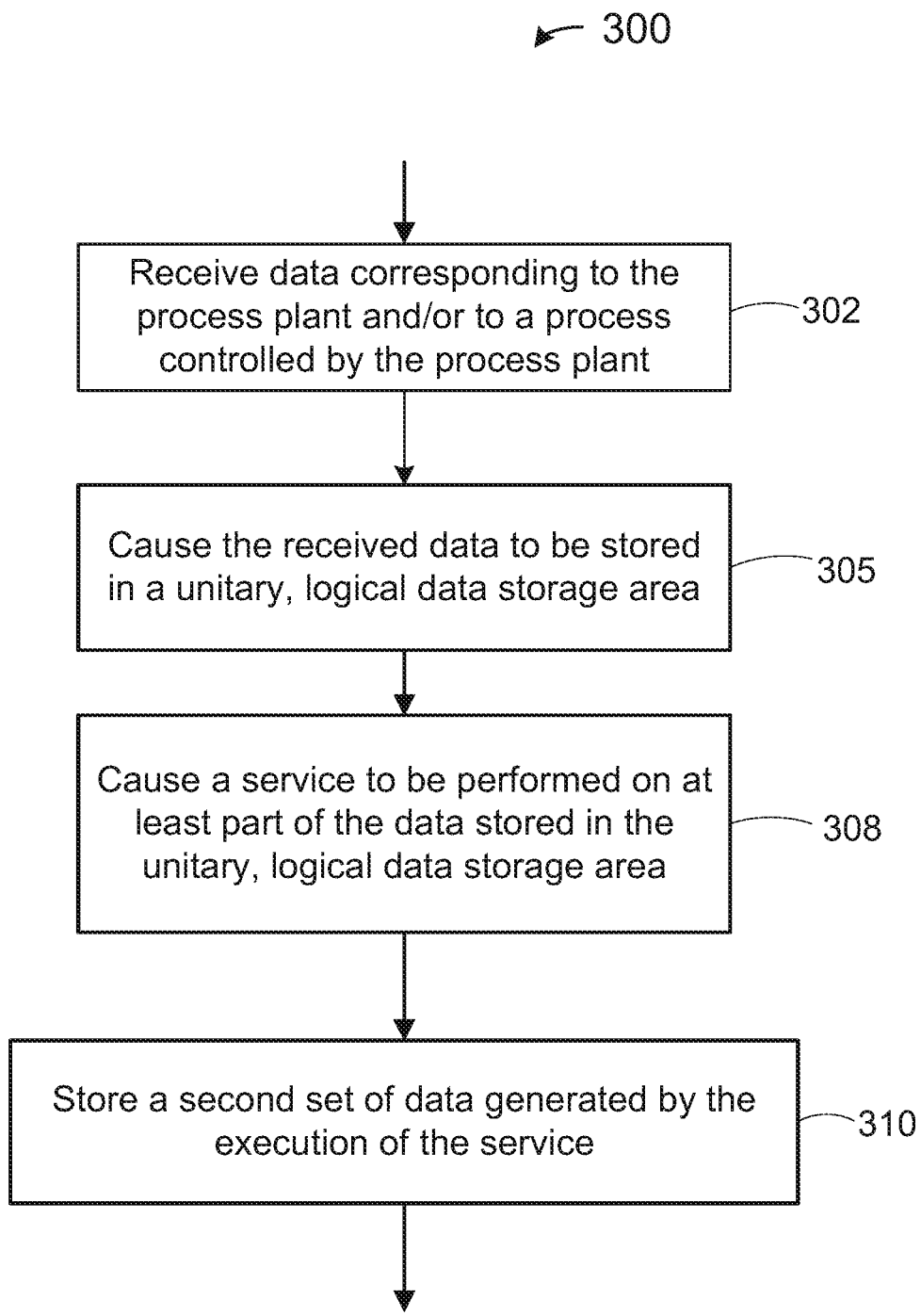
FIG. 7 is a flow diagram of an example method of supporting big data in a process control system or process plant.

FIG. 7 illustrates a flow diagram of an example method 300 for supporting big data in a process control system or process plant. The method 300 may be implemented in the process control system big data network 100 of FIG. 1, or in any other suitable network or system that supports big data in a process control system or process plant. In an embodiment, the method 300 is implemented by the process control system big data appliance 102 of FIG. 1. For illustrative (and non-limiting) purposes, the method 300 is discussed below with simultaneous reference to FIGS. 1-6.

At a block 302, data may be received. For example, the data may be received by the big data appliance 102 of the process control system big data network 100, e.g., by one or more data receivers 122. The data may correspond to a process plant and/or to a process being controlled by a process plant. For example, the data may include real-time data generated while controlling a process in the process plant, configuration data, batch data, network management and traffic data of various networks included in the process plant, data indicative of user or operator actions, data corresponding to the operation and status of equipment and devices included in the plant, data generated by or transmitted to entities external to the process plant, and other data.

The data may be received from one or more nodes 108 in communicative connection with the process control system big data network 100. For example, the data may be received from a provider node 110, a user interface node 112, and/or from another node 115 communicatively connected to the process control system big data network 100. The received data may include time series data, for example, where each data point is received in conjunction with a time stamp indicating a time of collection of the data point at a respective node 108.

In an embodiment, at least a portion of the data may be received using a streaming service. In an embodiment, the streaming service may be hosted by a node 108 of the process control system big data network 100, and the big data appliance 102 or a data receiver 122 included in the big data appliance 102 may subscribe to the streaming service hosted by the node 108.

At a block 305, the received data may be caused to be stored in a unitary, logical big data storage area such as the process control system big data appliance storage area 120, or some other suitable data storage area. The unitary, logical big data storage area may store data using a common format for all types of received data. In particular, the common format may enable real-time searching and exploration of the stored data in a timely and efficient manner. In an embodiment, the received data is stored in the unitary, logical big data storage area in conjunction with corresponding metadata.

At a block 308, a service may be caused to be performed on at least part of the data stored in the unitary, logical big data storage area. In an embodiment, the big data appliance 102 or an appliance request servicer 125 of the big data appliance 102 may cause the service to be performed. The service may be caused to be performed in response to a user request, or the service may be caused to be performed automatically. In an embodiment, the big data appliance 102 may select the service to be performed.

In an embodiment, the service may be a computational analysis, such as a regression analysis, a cluster analysis, a data trend analysis, or other computational analysis. For example, the computational analysis may operate on a first subset of data stored in the unitary, logical big data storage area, and may generate a result including a second subset of data. In an embodiment, the result may be presented to a user at a user interface. In an embodiment, the result may be presented to the user along with one or more suggestions, such as suggestions of additional computational analyses that may be desired to be run, a specific user action to be taken, a time that the specific user action is suggested to be taken, and the like.

The second subset of data may include a data definition or relationship. For example, the second subset of data may indicate a change to an existing entity associated with the process control system or plant, or may indicate a new entity to be associated with the process control system or plant. The changed or new entity may be, for example, a dashboard display component, a process model, a function block, a data relationship, a parameter or parameter value, a binding, or a computational analysis.

At a block 310, the second set of data may be stored. For example, the second set of data may be stored in the unitary, logical big data storage area.

In some embodiments, at the block 308, a service in addition to or instead of a computational analysis may be performed. For example, the service may be a configuration service, a diagnostic service, a control application service, a communication service, an administration service, an equipment management service, a planning service, or some other service.

Mobile Control Room

With the process control system big data network 100, dashboards displays 232 and the data studio portal 180 may be available at any authenticated user interface device 112. Further, user interface devices 112 may be mobile devices. As such, user interfaces and displays that are provided in prior art control systems only by workstations at fixed control room locations may be available at mobile user interface devices 112 in a system 10 supported by the process control system big data network appliance 102. Indeed, in some configurations of a system 10 supported by the process control system big data network appliance 102, all user interfaces related to a process plant 10 may be entirely provided at a set of mobile user interface devices 112 (e.g., a "mobile control room"), and the process plant 10 may not even include a fixed control room at all. In an embodiment, a user interface device 112 must be authenticated in order to perform any and all fixed control room functionality, including configuring and downloading models, creating and launching applications and utilities, performing activities pertaining to network management, secured access, system performance evaluations, product quality control, etc. For example, a user interface device 112 may be authenticated using a procedure such as previously discussed for authenticating devices and nodes at the process control system big data network 100.

To support such a mobile control room, the process control system big data network appliance 102 may provide or host one or more mobile control room services. A mobile control room service may be a particular type of data requester 130, for example, or may be another application. In an embodiment, a web server may be provided at each user interface device 112 to support a web based browser, web based application, or plug-in to interface with the mobile control room services hosted by the appliance 102.

One example of a mobile control room service may include an equipment awareness service. In this example, as a mobile worker moves his or her user interface device 112 within the plant 10, various provider devices or nodes 110 at fixed locations may automatically self-identify to the user interface device 112, e.g., by using a wireless communication protocol such as an IEEE 802.11 compliant wireless local area network protocol, a mobile communication protocol such as WiMAX, LTE or other ITU-R compatible protocol, a short-wavelength radio communication protocol such as near field communications (NFC) or Bluetooth, a process control wireless protocol such as WirelessHART, or some other suitable wireless communication protocol. The user interface device 112 and a fixed provider device 110 may automatically authenticate and form a secure, encrypted connection (e.g., in a manner such as previously discussed for the user interface device 112 and the data studio 109). In an embodiment, the equipment awareness service may cause one or more applications that specifically pertain to the fixed provider device 110 to be automatically launched at the user interface device 112, such as a work order, a diagnostic, an analysis, or other application.

Another example mobile control room service may be a location and/or scheduling awareness service. In this example, the location and/or scheduling awareness service may track a mobile worker's location, schedule, skill set, and/or work item progress, e.g., based on the mobile worker's authenticated user interface device 112. Based on the tracking, the location and/or scheduling awareness service at the appliance 102 may enable plant maps, equipment photos or videos, GPS coordinates and other information corresponding to a worker's location to be automatically determined and displayed on the user interface device 112 to aid the mobile worker in navigation and equipment identification. Additionally or alternatively, as a mobile worker may have a particular skill set, the location and/or scheduling awareness service may automatically customize the appearance of the worker's dashboard 232 based on the skill sets and/or the location of the user interface device 112. In another scenario, the location and/or scheduling awareness service may inform the mobile worker in real-time of a newly opened work item that pertains to a piece of equipment in his or her vicinity and that the mobile worker is qualified to address. In yet another scenario, the location and/or scheduling awareness service may cause one or more applications that specifically pertain to the location and/or skill set of the mobile worker to be automatically launched at the user interface device 112.

Still another example mobile control room service may be a mobile worker collaboration service. The mobile worker collaboration service may allow a secure collaboration session to be established between at least two user interface devices 112. In an embodiment, the secure collaboration session may be automatically established when the two devices 112 move into each other's proximity and become mutually aware of one another, e.g., by using a wireless protocol such as discussed above with respect to the equipment awareness service. Once the session is established, synchronization of data between the user interface devices 112 during a collaborative work session may be performed.

Yet another example mobile control room service may be a mobile worker application synchronization service. This service may allow a mobile worker to move his or her work between different hardware platforms (e.g., a mobile device, a work station, a home computing device, a tablet, and the like) while maintaining the state of his or her work in various applications. In embodiment, application synchronization may be automatically performed when two different hardware platform devices 112 move into each other's proximity and become mutually aware of one another, e.g., via a wireless protocol such as discussed above with respect to the equipment awareness service. For example, a mobile worker may simply bring his or her tablet into the vicinity of an office desktop computer to seamlessly continue work that was started in the field.

Of course, other mobile control room services in addition to the ones discussed herein may be possible, and may be supported by the process control system big data appliance network 100.

Embodiments of the techniques described in the present disclosure may include any number of the following aspects, either alone or combination:

1. A system for supporting big data in a process control plant, comprising a unitary, logical data storage area including one or more data storage devices configured to store, using a common format, data corresponding to at least one of the process plant or a process that is controlled in the process plant, the data including multiple types of data, and a set of types of data including configuration data, continuous data, and event data corresponding to the process. The system may further comprise one or more data receiver computing devices configured to receive the data from one or more other devices and to cause the received data to be stored in the unitary, logical data storage area.

2. The system of the previous aspect, wherein the data includes time series data.

3. The system of any of the preceding aspects, wherein a data entry of the time series data stored in the unitary, logical data storage area includes content and a timestamp, the timestamp being indicative of a time of generation of the content of the data entry.

4. The system of any of the preceding aspects, wherein the unitary, logical data storage area is further configured to store metadata corresponding to the data.

5. The system of any of the preceding aspects, wherein the data is stored using a common structured format, and wherein the metadata is stored using an unstructured format.

6. The system of any of the preceding aspects, wherein the data further includes at least one of: data indicative of a health of a machine included in the process plant, data indicative of a health of a particular piece of equipment included in the process plant, data indicative of a health of a particular device included in the process plant, or data corresponding to a parameter related to safety of the process plant.

7. The system of any of the preceding aspects, wherein the data further includes at least one of: data describing a user input entered at one of the one or more other devices; data describing a communication network of the process plant; data received from a computing system external to the process plant; or data received from another process plant.

8. The system of any of the preceding aspects, wherein the data describing the communication network of the process plant comprises data describing at least one of a performance, a resource, or a configuration of the communication network.

9. The system of any of the preceding aspects, wherein the one or more data storage devices are included in at least one of: a data bank, a RAID storage system, a cloud data storage system, a distributed file system, or other mass data storage system.

10. The system of any of the preceding aspects, wherein at least the portion of the data is streamed using a streaming service hosted by at least one of the one or more other devices, and wherein the unitary, logical data storage area or at least one of the one or more data receiver computing devices is a subscriber to the streaming service.

11. The system of any of the preceding aspects, wherein the one or more other devices includes: a field device and a controller that are communicatively coupled to control a process in the process plant, and at least one of a user interface device or a network management device.

12. The system of any of the preceding aspects, wherein all data generated at and received by at least one of the one or more other devices is caused to be stored at the unitary, logical data storage area.

13. The system of any of the preceding aspects, wherein the system further comprises a set of request servicer computing devices configured to perform one or more services using at least a portion of the data stored in the unitary, logical data storage area, the one or more services including a computational analysis.

14. The system of any of the preceding aspects, wherein at least one data receiver computing device and at least one request servicer computing device are an integral computing device.

15. The system of any of the preceding aspects, wherein at least one of the request servicer computing devices is further configured to determine, based on an execution of the computational analysis, a change to a configured entity included in the process plant.

16. The system of any of the preceding aspects, wherein the at least one of the request servicer computing devices is further configured to at least one of: (i) present the determined change at a user interface, or (ii) automatically apply the change to the configured entity.

17. The system of any of the preceding aspects, wherein the one or more services further include a service to generate a set of definitions corresponding to a set of entities that are able to be instantiated in a runtime environment of the process plant.

18. The system of any of the preceding aspects, wherein the set of entities includes at least one of: a configurable device, a diagnostic application, a display view application, a control model, or a control application.

19. The system of any of the preceding aspects, wherein the set of definitions is generated in an offline environment of the process plant, and wherein the system further comprises a set of scripts to transform at least one definition included in the set of definitions, and to load the transformed at least one definition into the runtime environment of the process plant.

20. The system of any of the preceding aspects, wherein the at least one definition is generated in the offline environment in response to a user input.

21. The system of any of the preceding aspects, wherein the at least one definition is generated in the offline environment automatically.

22. The system of any of the preceding aspects, wherein at least one of the one or more services is a web service.

23. A method for supporting big data in a process control plant, executed by any of the systems of any of the aspects described herein. The method may include receiving, at one or more data receiver computing devices, data corresponding to at least one of the process control plant or a process controlled by the process control plant; and causing the received data to be stored, using a common format, in a unitary, logical data storage area, the unitary, logical data storage area including one or more data storage devices configured to store multiple types of data using a common format, and a set of types of data including configuration data, continuous data, and event data corresponding to the process.

24. The method of the preceding aspect, wherein receiving the data comprises receiving at least a portion of the data using a streaming service.

25. The method of any of the preceding aspects, further comprising subscribing to the streaming service.

26. The method of any of the preceding aspects, wherein receiving the data comprises receiving the data from one or more other devices included in the process plant, the one or more devices including a controller in communicative connection with a field device to control the process.

27. The method of any of the preceding aspects, further comprising causing a service to be performed using at least a portion of the data stored in the unitary, logical data storage area.

28. The method of any of the preceding aspects, wherein causing the service to be performed comprises causing a computational analysis to be performed.

29. The method of any of the preceding aspects, wherein causing the computational analysis to be performed comprises causing the computational analysis to be performed in response to a user request.

30. The method of any of the preceding aspects, wherein causing the computational analysis to be performed comprises causing the computational analysis to be selected and performed automatically by the system.

31. The method of any of the preceding aspects, wherein the at least a portion of the data stored in the unitary, logical data storage area is a first set of data, and the method further comprises generating a second set of data based on an execution of the computational analysis on the first set of data.

32. The method of any of the preceding aspects, further comprising storing the second set of data in the unitary, logical data storage area.

33. The method of any of the preceding aspects, wherein storing the second set of data comprises storing at least one of: a display component definition, a binding definition, a process model definition, a data definition, a data relationship, or a definition of another computational analysis.

34. One or more tangible, non-transitory computer-readable storage media storing computer-executable instructions thereon that, when executed by a processor, perform the method of any of the preceding aspects.

35. A system, comprising any number of the preceding aspects. The system may be a process control system, and may further include: a controller configured to control a process in the process control system; a field device communicatively connected to the controller, the field device configured to perform a physical function to control the process in the process control system, and the field device configured to transmit to or receive from the controller real-time data corresponding to the physical function; and a process control system big data apparatus. The process control system big data apparatus may include: a unitary, logical data storage area including one or more data storage devices configured to store, using a common format, configuration data corresponding to the controller and the real-time data; and one or more data receiver computing devices to receive the real-time data and to cause the received data to be stored in the unitary, logical data storage area. The controller may be a first node of a process control system big data network, and the process control system big data apparatus may be a second node of the process control system big data network.

36. The system of any of the preceding aspects, wherein the process control system big data network includes at least one of a wired communication network or a wireless communication network.

37. The system of any of the preceding aspects, wherein the process control system big data network is at least partially an ad-hoc network.

38. The system of any of the preceding aspects, wherein the process control system big data network is a first communication network, and wherein the field device is communicatively connected to the controller via a second communication network different than the first communication network.

39. The system of any of the preceding aspects, wherein the process control system big data network further includes one or more other nodes, the one or more other nodes including at least one of: a user interface device, a gateway device, an access point, a routing device, a network management device, or an input/output (I/O) card coupled to the controller or to another controller.

40. The system of any of the preceding aspects, wherein the controller is configured to cache the real-time data, and wherein an indication of an identity of the real-time data is excluded from a configuration of the controller.

41. The system of any of the preceding aspects, further comprising a process control system big data user interface configured to enable a user, via a user interface device, to perform at least one user action from a set of user actions including: view at least a portion of the data stored in the unitary, logical big data storage area; request a service to be performed, the service requiring the at least the portion of the data stored in the unitary, logical big data storage area; view a result of a performance of the service; configure an entity included in the process control system; cause the entity to be instantiated in the process control system; and configure an additional service. The user interface device may be a third node of the process control system big data network.

42. The system of any of the preceding aspects, wherein the process control system big data user interface is configured to authenticate at least one of the user or the user interface device, and wherein one or more user actions included in the set of user actions is made available to the user for selection based on the authentication.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A system for supporting big data in a process control plant, comprising:
    a unitary, logical data storage area including one or more data storage devices configured to store, using a common format, data corresponding to at least one of the process plant or a process that is controlled in the process plant, the data including multiple types of data, and a set of types of data including configuration data, continuous data, and event data corresponding to the process; and
    one or more data receiver computing devices configured to receive the data from one or more other devices via a process control big data network and to cause the received data to be stored in the unitary, logical data storage area, wherein at least one of the one or more other devices communicates with one or more field devices in the process plant via another communication network different from the process control big data network,
        each of the one or more other devices being a respective node of the process control big data network that has a multi-core processor, a high density memory, and (i) collects data that is generated by the respective node, and (ii) streams the collected data in real-time via the process control big data network to the one or more data receiver computing devices at a rate in which the data is generated, received, or obtained, wherein the high density memory of each of the one or more other devices caches the collected data with a corresponding timestamp, the timestamp being indicative of a time of generation of the collected data.

2. The system of claim 1, wherein the data stored in the unitary, logical data storage area includes time series data, and wherein a data entry of the time series data stored in the unitary, logical data storage area includes content of a respective data point of the time series data and a timestamp, the timestamp being indicative of a time of generation of the content of the data point corresponding to the data entry.

3. The system of claim 1, wherein the unitary, logical data storage area is further configured to store metadata corresponding to the received data, the received data is stored using a common structured format, and the metadata is stored using an unstructured format.

4. The system of claim 1, wherein the data stored in the unitary, logical data storage area further includes at least one of:
    data indicative of a health of a machine included in the process plant,
    data indicative of a health of a particular piece of equipment included in the process plant,
    data indicative of a health of a particular device included in the process plant,
    data corresponding to a parameter related to safety of the process plant, or
    data corresponding to at least one of a performance, a resource, or a configuration of the another communication network.

5. The system of claim 1, wherein the received data includes data received from another process plant.

6. The system of claim 1, wherein the one or more data storage devices are included in a cloud data storage system.

7. The system of claim 1, wherein at least the portion of the received data is streamed over the process control big data network using a streaming service hosted by at least one of the one or more other devices, and wherein the unitary, logical data storage area or at least one of the one or more data receiver computing devices is a subscriber to the streaming service.

8. The system of claim 1, wherein the one or more other devices includes:
    a controller that communicates with at least one of the one or more field devices via the another communication network to control the process.

9. The system of claim 8, wherein the one or more other devices further includes at least one of a user interface device or a network management device.

10. The system of claim 1, wherein the system further comprises a set of request servicer computing devices configured to perform one or more services using at least a portion of the data stored in the unitary, logical data storage area, the one or more services including a computational analysis.

11. The system of claim 10, wherein at least one of the request servicer computing devices is further configured to determine, based on an execution of the computational analysis, a change to a configured entity included in the process plant and at least one of: (i) present the determined change at a user interface, or (ii) automatically apply the change to the configured entity.

12. The system of claim 10, wherein the one or more services further include a service to generate a set of definitions corresponding to a set of entities that are configured to be instantiated in a runtime environment of the process plant, wherein the set of entities includes at least one of: a configurable device, a diagnostic application, a display view application, a control model, or a control application, and wherein the set of definitions are able to be transformed and loaded into the runtime environment of the process plant.

13. A method for supporting big data in a process control plant, comprising:

receiving, via a process control big data network at one or more data receiver computing devices from each of one or more nodes of the process control big data network, data corresponding to at least one of the process plant or a process controlled by the process plant, wherein at least one of the one or more nodes communicates with one or more field devices in the process plant via another communication network different from the process control big data network, the data received from the each node including data that is generated by the each node while the process is being controlled, the each node streaming the data in real-time at a rate in which the data is generated, received, or obtained, and the each node having a multi-core processor and a high density memory that caches the data with a corresponding timestamp, the timestamp being indicative of a time of generation of the data; and causing the received data to be stored, using a common format, in a unitary, logical data storage area, the unitary, logical data storage area including one or more data storage devices configured to store multiple types of data using a common format, and a set of types of data including configuration data, continuous data, and event data corresponding to the process.

14. The method of claim 13, further comprising causing a computational analysis to be automatically performed using at least a portion of the data stored in the unitary, logical data storage area.

15. The method of claim 14,
wherein the at least a portion of the data stored in the unitary, logical data storage area is a first set of data; and
the method further comprises:
generating a second set of data based on an execution of the computational analysis on the first set of data, and
storing the second set of data in the unitary, logical data storage area.

16. The method of claim 15, wherein the second set of data includes at least one of: a display component definition, a binding definition, a process model definition, a data definition, a data relationship, or a definition of another computational analysis.

17. The method claim 15,
wherein the computational analysis is a first service; and
the method further comprises causing a second service to be automatically performed using the second set of data.

18. A process control system, comprising:
a controller configured to control a process in the process control system;

a field device communicatively connected to the controller via a communication network of the process plant, the field device configured to perform a physical function to control the process in the process control system, and the field device configured to transmit to or receive from the controller, via the communication network, real-time data corresponding to the physical function; and a process control system big data apparatus, the process control system big data apparatus including:
a unitary, logical data storage area including one or more data storage devices configured to store, using a common format, the real-time data and configuration data corresponding to the controller; and
one or more data receiver computing devices to (i) receive, via a process control system big data network different than the communication network, the real-time data and the configuration data corresponding to the controller, and (ii) to cause the received data to be stored in the unitary, logical data storage area;

wherein:
the controller is a first node of a process control system big data network,
the process control system big data apparatus is a second node of the process control system big data network,
at least one of the field device or the controller streams the real-time data via the process control system big data network at a rate in which the data is generated, received, or obtained, and
at least one of the field device or the controller has a multi-core processor, and a high density memory, and the high density memory caches the real-time data with a corresponding timestamp, the timestamp being indicative of a time of generation of the real-time data.

19. The process control system of claim 18, further comprising a process control system big data user interface having a user control presented via a user interface device, to perform at least one user action from a set of user actions including:
present at least a portion of the data stored in the unitary, logical data storage area;
request a service to be performed, the service requiring at least the portion of the data stored in the unitary, logical data storage area;
present a result of a performance of the service; or
configure an additional service.

20. The process control system of claim 19, wherein:
the process control system big data user interface is configured to authenticate at least one of the user, the user interface device, or an access application running on the user interface device; and
one or more user actions included in the set of user actions is made available to the user for selection based on the authentication.

21. The system of claim 1, wherein each of the one or more other devices streams the collected data via the process control big data network to the one or more data receiver computing devices without compressing the collected data.

* * * * *